United States Patent [19]
Ito et al.

[11] Patent Number: 5,199,485
[45] Date of Patent: Apr. 6, 1993

[54] AIR CONDITIONER FOR MOTOR VEHICLE HAVING RIGHT, LEFT AND CENTER TEMPERATURE CONTROLLED VENTS

[75] Inventors: Toshikatsu Ito, Toukai; Tsuneo Kagohata, Oomiya; Masashi Suzuki, Katsuta, all of Japan

[73] Assignee: Hitachi, Ltd., Tokyo, Japan

[21] Appl. No.: 738,589

[22] Filed: Jul. 31, 1991

[30] Foreign Application Priority Data

| Aug. 3, 1990 | [JP] | Japan | 2-205007 |
| Aug. 7, 1990 | [JP] | Japan | 2-208636 |
| Sep. 3, 1990 | [JP] | Japan | 2-230686 |

[51] Int. Cl.$^5$ .................................. F25B 29/00
[52] U.S. Cl. ................................ 165/22; 165/42; 165/43; 454/160; 454/161; 454/126; 454/127; 454/75; 236/91 C
[58] Field of Search .................. 165/42, 43, 22; 98/2.01, 2.11; 454/160, 161, 126, 127, 75; 236/91 C

[56] References Cited

FOREIGN PATENT DOCUMENTS

| 55-51615 | 4/1980 | Japan . | |
| 58-22710 | 2/1983 | Japan . | |
| 0122213 | 7/1983 | Japan | 165/43 |
| 59-109420 | 6/1984 | Japan . | |
| 0282115 | 12/1986 | Japan | 98/2.11 |
| 0074709 | 4/1988 | Japan | 98/2.01 |
| 0022619 | 1/1989 | Japan | 98/2.11 |
| 0186412 | 7/1989 | Japan | 98/2.11 |
| 0024214 | 1/1990 | Japan | 98/2.01 |

Primary Examiner—John K. Ford
Attorney, Agent, or Firm—Antonelli, Terry, Stout & Kraus

[57] ABSTRACT

An air conditioner is provided for a motor vehicle which controls the division of the blow-out air by individually adjusting the blow-out air temperature of the center vent, right side vent and left side vent over a broad temperature range. The blow-out air temperature is controlled from the upper and lower and right and left blow-out parts by the passengers of the motor vehicle to place the cabin of the motor vehicle into a comfortable temperature range. The conditioned air within the conditioned air passages is responsive to load conditions both inside and outside of the passenger compartment to individually adjust the temperature of the conditioned air. A first and second auxiliary duct which introduces cool air from the upstream side of the air mix door and warm air from the downstream side of the heater unit into the conditioned air flows through the right side vent duct, and left side vent duct, respectively. Each of the auxiliary ducts includes a temperature control door to adjust the mixture ratio of the cool and warm air. A control unit utilizes a target temperature for each the left side vent blow-out port and the right side vent blow-out port by utilizing the blow-out air temperature from the center vent blow-out port as a reference temperature, and temperature control doors are actuated so that the predetermined target temperatures are reached.

2 Claims, 24 Drawing Sheets

AIR CONDITIONER FOR MOTOR VEHICLE HAVING RIGHT, LEFT AND CENTER TEMPERATURE CONTROLLED VENTS

The present invention relates to an air conditioner for a motor vehicle in which conditioned air blow-out ports are selected independently each other and their temperatures are also individually controlled.

BACKGROUND OF THE INVENTION

JP-A-59-109420(1984) discloses an air conditioner for a motor vehicle in which the air flow passage from a heater core is divided into three subpassages, into each of which a damper (hereinafter called an air mix door) for adjusting the mixture ratio of cool air and warm air is disposed, and the upper blow-out air temperature is adjusted by the right and left air mix doors independent from the lower blow-out air temperature which is adjusted by the center air mix door.

In the above air conditioner the blow-out air division among upper and lower blow-out ports during the bi-level operation mode, in other words ventilation (hereinafter called vent) and floor blow-out mode, differs from that during the heater mode, in other words in the defroster and floor mode, no further individual temperature adjustment from the driver and the passenger next to the driver is considered, thereby it is difficult to control the temperature distribution and air current distribution in the cabin comfortable for both the driver and the passenger next to the driver.

Further, in the above air conditioner, the respective blow-out ports are arranged perpendicular with respect to the air blow-out direction from the blower thereby the equivalent air quantity division to the respective blow-out ports has to be achieved by changing the division ratio of the respective conditioned air passages, as a result the air flow resistance therethrough is increased to cause large noises.

JP-A-55-51615 (1980) discloses an air conditioner for a motor vehicle in which a plurality of temperature conditioned air flow passages are formed and each of which is provided with predetermined blow-out ports.

In the above air conditioner, blow-out temperatures in three levels can be obtained depending upon the blow-out port positions however no individual adjustment is considered with respect to the temperature and air current distribution at right and left sides in the cabin in response to the environmental thermal load condition so that there is a problem that the blow-out temperature can not be controlled properly.

JP-A-58-22710 (1983) discloses an air conditioner for a motor vehicle in which conditioned air of which temperature is adjusted by an air mix door is divided and led into a plurality of blow-out ports, a plurality of branched ducts are provided which lead cool air from the upstream of the air mix door to mix with the conditioned air in the respective blow-out ports and a distributing valve which adjusts the mixture ratio of the cool air into the conditioned air is provided at each opening portion of the branched ducts, thereby the temperature of the conditioned air blown-out from the respective blow-out ports is individually adjusted.

However, in the above air conditioner, only the cool air from the upstream of the air mix door are mixed with the conditioned air, it is impossible to blow-out air with a higher temperature than that of the conditioned air. For this reason, when the air temperature from one blow-out port, for example from the blow-out port of the right side vent is desired to be higher than that of the conditioned air temperature of the conditioned air, the right side vent temperature has to be raised through the actuation of the air mix door, and in this instance, air temperature from the other blow-out ports such as from the center vent and left side vent rises. Accordingly, even if thereafter the amount of cool air is increased through the actuation of the corresponding distributing values in order to resume the original air temperature, a temporary temperature rise can not be avoided, as a result, the air temperature blowing out respectively from the center vent, right side vent and left side vent can not be accurately and individually controlled. Further, there is a problem that the control for the temperature adjustment is complex because the air mix door as well as many distributing valves have to be controlled. Still further, long and complexed branched ducts are required for conveying the cool air to the respective blow-out ports.

SUMMARY OF THE INVENTION

One object of the present invention is to provide an air conditioner for a motor vehicle which enables the air conditioner to properly control the blow-out air temperature from the upper and lower and right and left blow-out ports and to control the blow-out air quantity division from the upper and lower blow-out ports depending upon the operating mode to be applied.

Another object of the present invention is to provide an air conditioner for a motor vehicle which enables the air conditioner to provide a comfortable conditioned air to the passengers by properly controlling the blow-out air quantity division.

Further object of the present invention is to provide an air conditioner for a motor vehicle which enables the air conditioner to individually adjust the blow-out air temperature of the center vent, right side vent and left side vent over a broad temperature range such as from a higher to a lower temperature.

A still further object of the present invention is to provide an air conditioner for a motor vehicle which enables the air conditioner to individually and easily adjust the blow-out air temperature from the center vent, right side vent and left side vent.

Still further object of the present invention is to provide a compact air conditioner for a motor vehicle in which cool air passages are minimized and are included in the heater unit, and the blow-out air temperature from the upper and lower and right and left blow-out ports is individually controlled in response to the said control of the passengers.

A first aspect of the present invention is to provide an air conditioner for a motor vehicle in which blow-out air from the respective blow-out ports into the cabin is separately adjusted and the temperature and air current distribution in the cabin are maintained in into a comfortable state, and further, a plurality of conditioned air passages, each provided with an air mix door, are formed downstream with respect to an evaporator, each of the conditioned air passages includes a plurality of parallel blow-out ducts, each of the parallel blow-out duct leading to respective blow-out ports in the cabin as well as having respective blow-out port change-over doors, and predetermined blow-out ducts in the conditioned air passage are communicated at the downstream of the blow-out port change-over doors, which are selectively actuated based upon the load conditions in and out of the cabin and upon the operation mode determined so as to locally adjust the temperature and air current distribution in the cabin.

A second aspect of the present invention is to provide an air conditioner for a motor vehicle in which the temperature conditioned air via an air mix door is divided to lead respectively toward a center vent blow-out port, right side vent blow-out port and left side vent blow-out port and which further incorporates a first auxiliary duct which introduces cool air from the upstream of the air mix door and warm air from the downstream of a heater unit into the conditioned air flowing through the right side vent duct; a second auxiliary duct which introduces the cool air from the upstream of the air mix door and the warm air from the downstream of the heater unit into the conditioned air flowing through the left side vent duct; a first temperature control door disposed in the first auxiliary duct adjusting the mixture ratio of the cool and warm air; and a second temperature control door disposed in the second auxiliary duct adjusting the mixture ratio of the cool and warm air.

The air conditioner for a motor vehicle of the second aspect according to the present invention further comprises a control unit in which respective target temperatures for the blow-out air temperatures from the right side vent blow-out port and the left side vent blow-out port are determined by making use of the blow-out air temperature from the center vent blow-out port as a reference temperature, and the temperature control doors are actuated so that the predetermined target temperatures are reached.

In the air conditioner for a motor vehicle of the second aspect according to the present invention, the same conditioned air as in the center vent duct flows through the right side and left side vent ducts as the main conditioned air, further, into the right side vent duct and the left side vent duct the cool air and the warm air are respectively introduced via the first and second auxiliary ducts to mix with the main conditioned air, and through the adjustment of the mixture ratio of the cool air and the warm air with the first and second temperature control doors the blow-out air temperatures from the respective side vent blow-out ports are controlled individually with respect to the blow-out conditioned air temperature from the center vent blow-out port.

For example, in summer time, cool air from the upstream of the air mix door is introduced into both the right and left side vent ducts to reduce blow-out air temperature from both the right and left side vent blow-out ports with respect to the blow-out air temperature from the center vent blow-out port, in winter time the blow-out air temperatures from the right and left side vent blow-out ports are controlled comparatively high with respect to the blow-out air temperature from the center vent blow-out port by introducing the warm air from the downstream of the heater unit. Further in the intermediate season and in winter time with sunshine, in order that the blow-out air temperature at the side of the side vent with sunshine radiation is maintained comparatively lower, the blow-out air temperature at the center vent is maintained at intermediate temperature and the blow-out air temperature at the side of the side vent with no sunshine radiation is maintained comparatively high, the blow-out air temperature from the center vent blow-out port which is used as the reference temperature is controlled by means of the air mix door, the blow-out air temperature from the side vent with sunshine radiation is individually controlled by introducing the cool air from the upstream of the air mix door into the conditioned air having the same blow-out air temperature as in the center vent blow-out air by means of the first or second temperature control door and the blow-out air temperature from the side vent without sunshine radiation is also individually controlled by introducing the warm air from the downstream of the heater unit into the conditioned air having the same blow-out air temperature as in the center vent blow-out air by means of the first or second temperature control door.

Further, in the bi-level mode operation, the blow-out air temperature from a floor blow-out port toward feet and the blow-out air temperature from the center vent blow-out port are adjusted by means of the air mix door and the blow-out temperatures from the right and left side vent blow-out ports are individually controlled by means of the first and second temperature control doors, thereby the temperature distribution in the cabin with respect to upper and lower and right and left thereof is maintained in a comfortable condition.

As explained above, in the air conditioner for a motor vehicle of the second aspect according to the present invention, by making use of the blow-out air temperature from the center vent blow-out port which is less affected by the thermal load as a reference temperature, the blow-out air temperatures from the side vent blow-out ports which are much affected by the thermal load variation are individually controlled based upon thermal load over a temperature range from higher to lower such that a comfortable air conditioning for the passengers is realized.

Further, as explained above, the blow-out temperatures from the right side vent blow-out port and left side vent blow-out port are adjusted with reference to the blow-out conditioned air temperature from the center vent blow-out port such that the blow-out air temperatures are easily controlled.

Still further, the cool air and warm air from the first and second auxiliary ducts are used only for adjusting the main conditioned air temperature, the amount of the cool air and warm air to be added is limited such that the size of the first and second auxiliary ducts can be reduced, therefore the fundamental structure of the conventional air conditioner employing reheat air mixing method can be used with a small modification such that the manufacture thereof is facilitated.

A third aspect of the present invention is to provide an air conditioner for a motor vehicle which includes an evaporator for cooling intake air; a heater unit for reheating the cooled air by the evaporator; a cool air passage bypassing the heater core in the heater unit, an air mix door for adjusting blow-out air temperature by varying the mixing ratio of the reheated warm air and the cool air bypassed the heater core, and plural kinds of mode doors such as vent doors and floor doors which permit selective blow-out of the conditioned air adjusted by the air mix door, and further comprises a partition plate which divides an air passage downstream of the mode doors into parallel air passages; auxiliary cool air passages which bypass the cool air from the upstream of the air mix door into respective divided air passages downstream the vent doors; auxiliary warm air passages which bypass the warm air from the downstream of the heater core into the respective auxiliary cool air passages; temperature control doors respectively disposed at the junctures of the auxiliary cool air passages and auxiliary warm air passages for adjusting the mixing ratio of the bypassed cool and warm air; auxiliary mixed air passages disposed downstream of the respective temperature control doors for conveying the mixed air into the respective divided air passages downstream of the floor doors; and mode control doors disposed at the respective junctures between the auxiliary mixed air passages and the divided air passages downstream the floor doors for switching the flow of the mixed air between the divided air passages downstream the vent doors and the divided air passages downstream the floor doors, whereby the blow-out ports of the temperature adjusted conditioned air can be freely selected between the vent blow-out ports and the floor blow-out ports.

In the air conditioner according to the third aspect of the present invention, now, when the passenger on the right side, for example the driver of the vehicle, wants somewhat lower temperature blow-out air from the vent blow-out port, the right side temperature control door is actuated so as to increase the rate of the cool air such that the cool air controlled via the temperature control door is mixed into the conditioned air by the air mix door thereby only the blow-out air from the right side vent blow-out port is cooled. On the other hand, when the passenger on the left side, for example the passenger next to the driver, wants a somewhat higher temperature blow-out air from the vent blow-out port, the left side temperature control door is actuated so as to increase the rate of warm air such that the warm air controlled via the temperature control door is mixed into the conditioned air by the air mix door thereby only the blow-out air from the left side vent blow-out port is heated. When the passenger next to the driver wants further higher temperature blow-out air, such will be obtained by further increasing the rate of the warm air by the corresponding temperature control door, however the desired temperature exceeds a predetermined level the left side mode control door changes over the mixed air passing through the auxiliary mixed air passage toward the divided air passage downstream the floor door and individually controls the blow-out temperature from the left side floor blow-out port, accordingly, the blow-out air of a desired temperature and from a desired blow-out port for the respective passengers is obtained.

EXPLANATION OF PREFERRED EMBODIMENTS

Hereinbelow, three embodiments of the present invention will be explained with reference to the drawings, in which the elements bearing the same numerals designate the same or equivalent elements throughout the specification.

Figure 1:
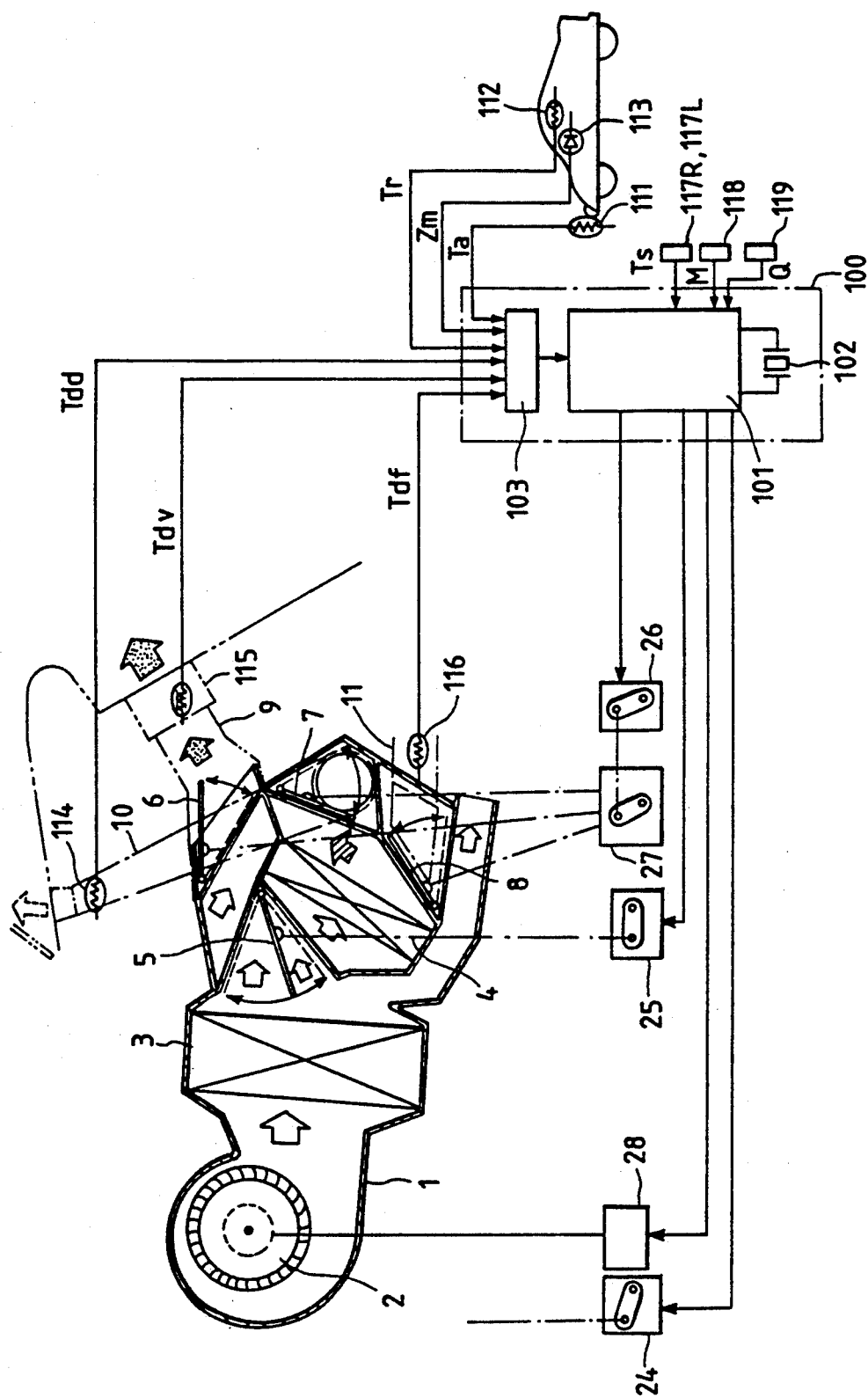
FIG. 1 is schematic diagram of an air conditioner for a motor vehicle showing first embodiment according to the present invention.

FIG. 1 is an overview diagram of an air conditioner for a motor vehicle showing first embodiment according to the present invention, which is adapted to be controlled by a motor vehicle mounted microcomputer which performs digital processing operation according to predetermined soft wear control programs.

Figure 2:
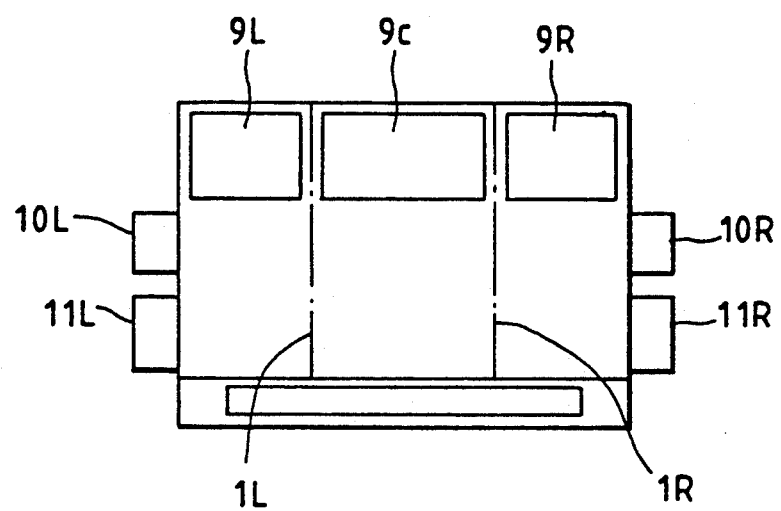
FIG. 2 is a front view of the air conditioner shown in FIG. 1.

In the drawing, numeral 1 is a casing which accommodates several units in the air conditioner, from an air inlet port a blower 2, an evaporater 3 and a heater core 4 are arranged in this order in the casing 1. As the air inlet port of the blower 2 an intake box not shown is provided for selectively introducing outer air or inner air. Numeral 5 is an air mix door which controls the mixture ratio between the cool air bypassing the heater core 4 and the warm air passed through the heater core 4 to adjust the blow-out air temperature into the cabin. Numerals 6, 7 and 8 are respectively mode doors for vent, defroster and floor blow-out ports, and the air blow-out ports are selected via the combination of opening and closing of the mode doors 6, 7 and 8 in response to the desire of the passengers and the thermal load condition of the motor vehicle. FIG. 2 is an outlook of the air conditioner of the first embodiment seen from the front thereof, the conditioned air passage downstream the air mix doors 5 is divided into three passages by partition walls 1R and 1L. Therefore, the air conditioner according to the first embodiment includes three conditioned air passages of which side cross section is shown in FIG. 1 and each of the three passages is provided with an air mix door for adjusting the blow-out air temperature and respective blow-out ports change-over doors for vent, defroster and floor blow-out.

In FIG. 2, 9R shows a right side vent blow-out port, 9L a left side vent blow-out port and 9C a center vent blow-out port, likely, 10R shows a right side defroster blow-out port, 10L a left side defroster blow-out port, 11R a right side floor blow-out port and 11L a left side floor blow-out port. Turning back again to FIG. 1 with reference thereto the air conditioner according to the first embodiment is explained. In the drawing, 9 is a vent duct connected to the vent blow-out ports 9R, 9L and 9C, 10 is a defroster duct connected to the defroster blow-out ports 10R and 10L and 11 is a floor duct connected to the floor blow-out ports 11R and 11L. In FIG. 1, the apparatus in connection with a refrigerating cycle control system to be connected to the evaporator 3 and a warm water control system to be connected to the heater core 4 are omitted because such are the conventional ones and are not directly related to the present invention. Numeral 100 indicates a control unit in the air conditioner wherein 101 is a microcomputer of a single chip LSI which performs digital processing operation according to predetermined software control programs to constitute operation processing means which is connected with a quartz oscillator 102 having oscillation frequency of several MHz and is supplied from a motor vehicle mounted battery to render the microcomputer operative. The microcomputer 101 is constructed by a large scaled integrated circuit of one chip which is composed of, as its major parts, a control processing unit which reads out one after another the control programs determining the operation sequence and carries out the corresponding operations processing, a clock generating unit including the quartz oscillator for generating reference pulses for use in several kinds of operations and an I/O circuit unit for regulating inputs and outputs of several kinds of signals. Based upon respective detected signals from an ambient temperature sensor 111, a vehicle cabin temperature sensor 112, a solar radiation sensor 113, a defroster blow-out air temperature sensor 114, a right side vent blow-out air temperature sensor 115R, a left side vent blow-out air temperature sensor 115L, a center vent blow-out air temperature sensor 115C, right side floor blow-out air temperature sensor 116R and a left side floor blow-out air temperature sensor 116L which are converted one after another into digital signals via an A/D converter 103, and set signals from right and left side temperature setting units 117R and 117L, an operation mode setting unit 118, and a blower speed setting unit 119, the microcomputer 101 performs several kinds of calculations and decisions and generates control signals such as for an air inlet port change-over door (not shown), the air mix doors 5, the vent doors 6R, 6L, 6C, defroster doors 7R, 7L, 7C and the floor doors 8R, 8L, 8C. 24 is an actuator for the air inlet port change-over door (not shown) which changes-over the door between inner air and outer air in responses to an inner and outer air change-over instruction signal issued from the microcomputer 101. 25 (25R, 25L, 25C) are opening degree adjusting acutuators for blow-out air temperature control, which adjust the opening degrees of the air mix doors 5 (5R, 5L, 5C) in response to instruction signals with regard to the opening degree control from the microcomputer 101. 26 is a blow-out port change-over actuator which actuates selected blow-out port change-over doors 6 (6R, 6L, 6C), 7 (7R, 7L, 7C) and 8 (8R, 8L, 8C) via a side link mechanism 27 in response to open and close instruction signals from the microcomputer 101 thereby to blow-out the conditioned air therefrom into the cabin. 28 is a driving circuit for the blower which continuously controls the rotating speed of the blower 2 in response to the rotation speed instruction signals from the microcomputer 101.

Now, hereinbelow how the temperature is individually controlled of the blow-out air into the vehicle cabin from the respective blow-out ports in the air conditioner according to the first embodiment, and how the blow-out ports are selected are explained.

Figure 3:
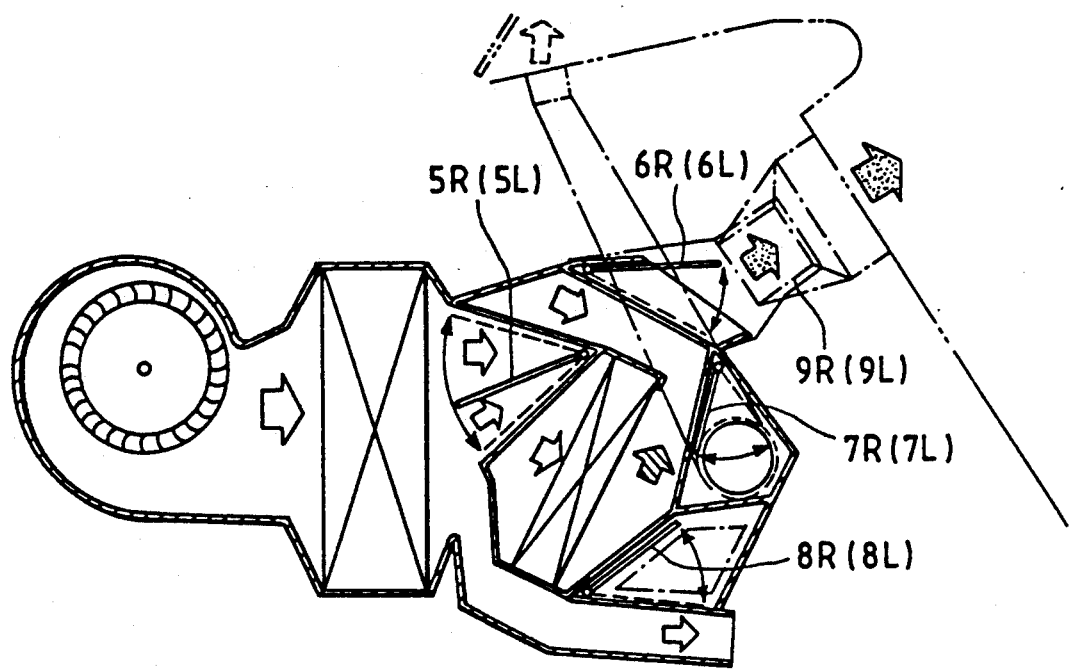
FIG. 3 is a schematic diagram showing air flow in both side air passages of the air conditioner shown in FIG. 1 during vent blow-out operation mode.
Figure 4:
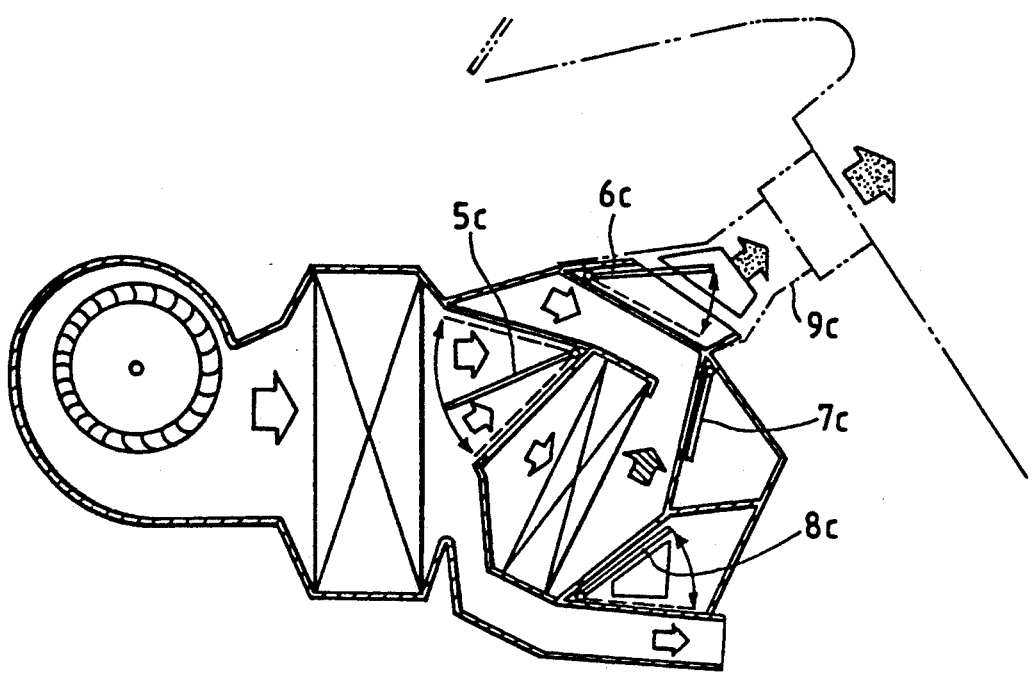
FIG. 4 is a schematic diagram showing air flow in the center air passage of the air conditioner shown in FIG. 1 during the vent blow-out operation mode.

FIGS. 3 and 4 respectively show schematically cross-sections of the side (right and left) and center conditioned air passages seen from their lateral direction during the vent blow-out operation mode in which the vent doors 6R, 6L, 6C are opened, the defroster doors 7R, 7L, 7C are closed and the floor doors 8R, 8L, 8C are closed such that when the air mix doors 5R, 5L, 5C are individually actuated, blow-out air having temperature depending upon the opening degrees of the respective air mix doors is individually blown-out into the cabin via the respective selected blow-out ports.

Figure 5:
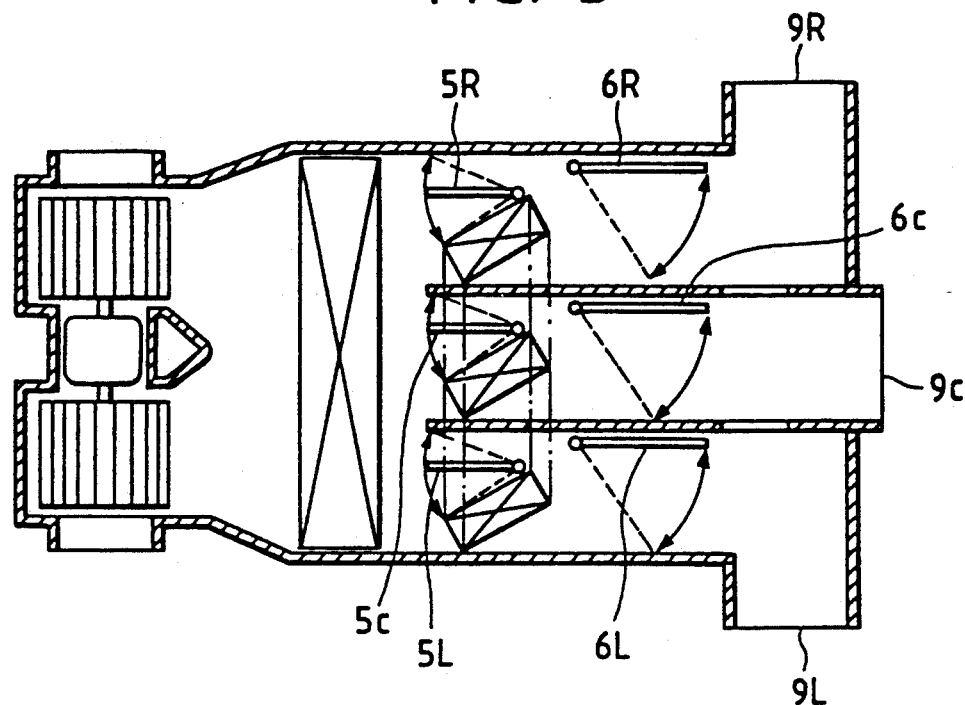
FIGS. 5, 6 and 7 are schematic diagrams showing conditions of respective mode doors during the vent blow-out operation mode.
Figure 6:
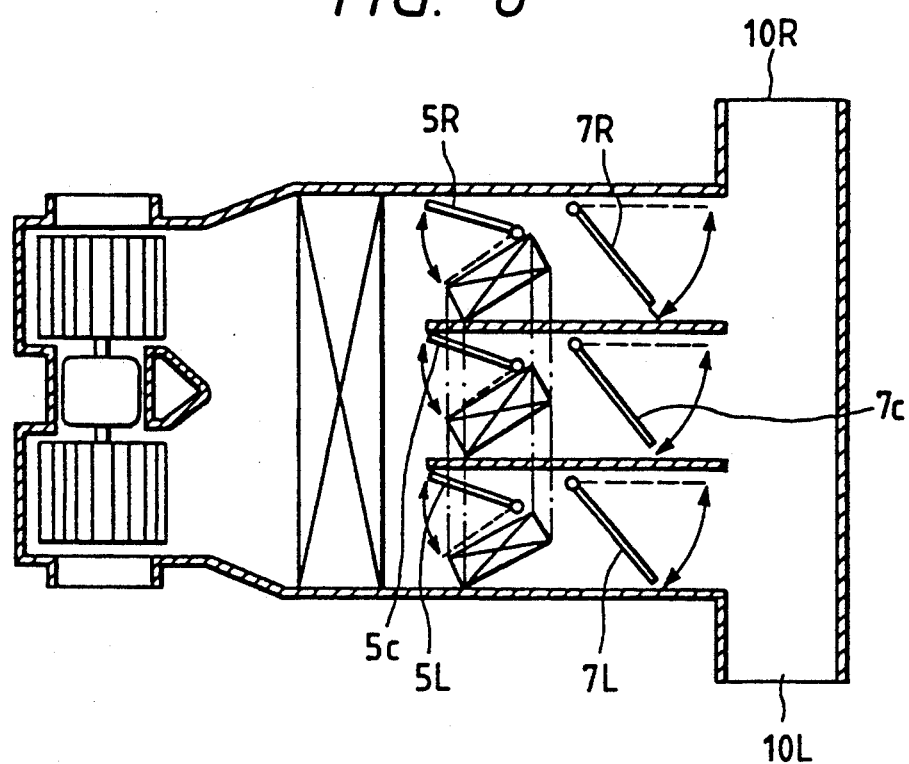
Figure 7:
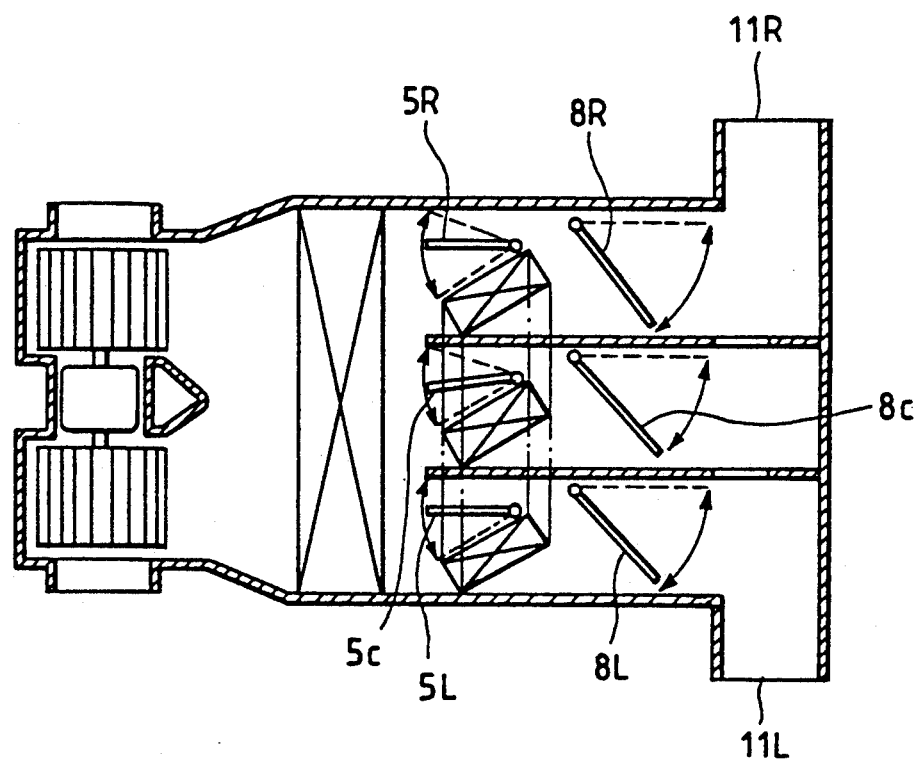

FIGS. 5, 6 and 7 show schematic cross sections of the air conditioner according to the first embodiment seen from the top thereof and which are prepared for explaining change-over operation by the blow-out port change-over doors leading to the respective blow-out ports during the vent blow-out operation mode, FIG. 5 shows a state where the vent doors 6R, 6L, 6C are opened, FIG. 6 shows a state where the defroster doors 7R, 7L, 7C are closed and FIG. 7 shows a state where the floor doors 8R, 8L, 8C are closed, thereby the blow-out air temperature from the right side vent blow-out port 9R, the blow-out air temperature from the left side vent blow-out port 9L, and the blow-out air temperature from the center vent blow-out port 9C are individually controlled by the air mix doors 5R, 5L, and 5C respectively.

Figure 8:
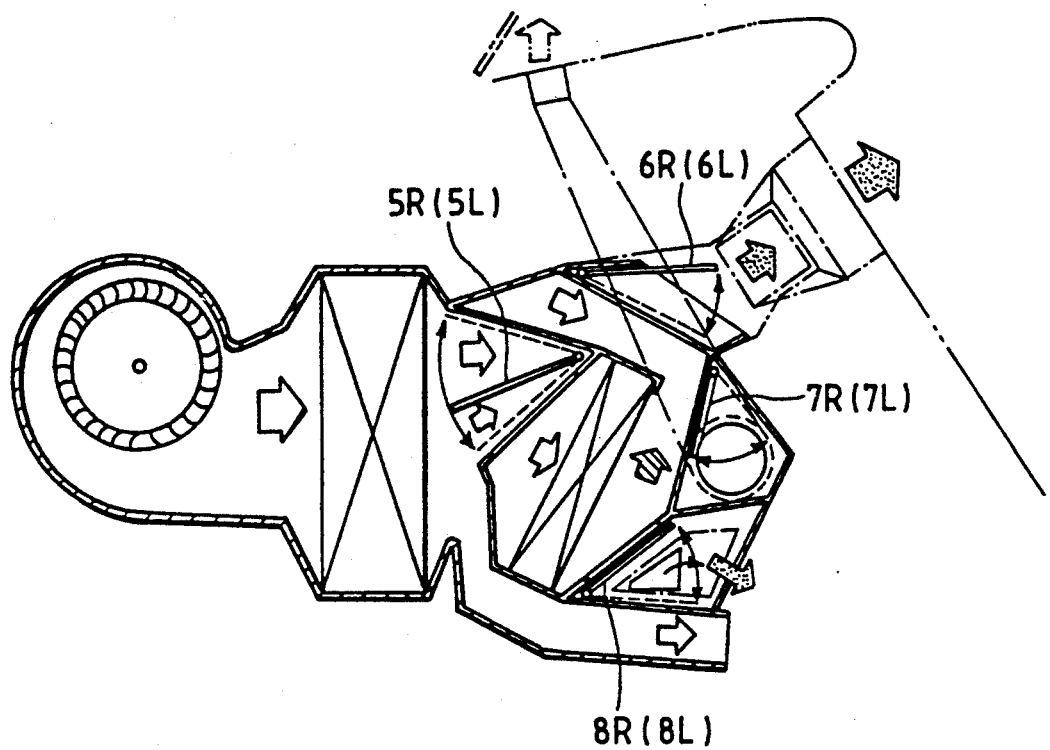
FIG. 8 is a schematic diagram showing air flow in both side air passages of the air conditioner shown in FIG. 1 during bi-level blow-out operation mode.
Figure 9:
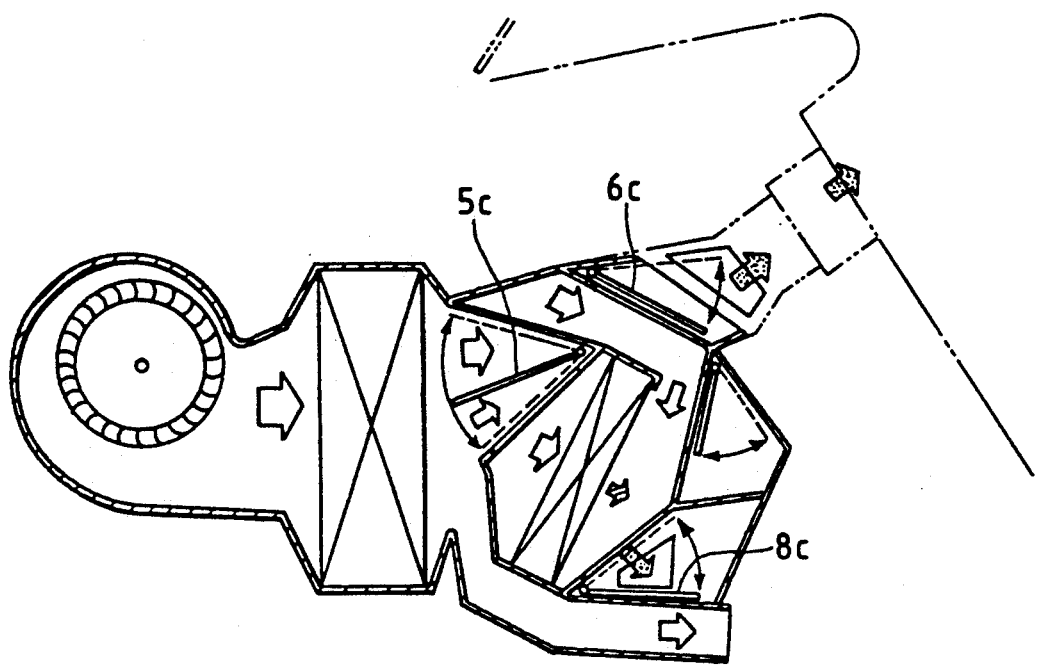
FIG. 9 is a schematic diagram showing air flow in the center air passage of the air conditioner shown in FIG. 1 during the bi-level blow-out operation mode.

FIG. 8 and 9 respectively show schematically cross-sections of the side (right and left) and center conditioned air passages seen from their lateral direction during the bi-level blow-out operation mode in which the vent doors 6R, 6L are opened and the vent door 6C is closed, the defroster doors 7R, 7L, 7C are closed, and the floor doors 8R, 8L, are closed and the floor door 8C is opened such that the respective blow-out temperatures from the right side vent blow-out port 9R, the left side vent blow-out port 9L and floor blow-out ports are individually adjusted by the air mix doors 5R, 5L and 5C respectively.

Figure 10:
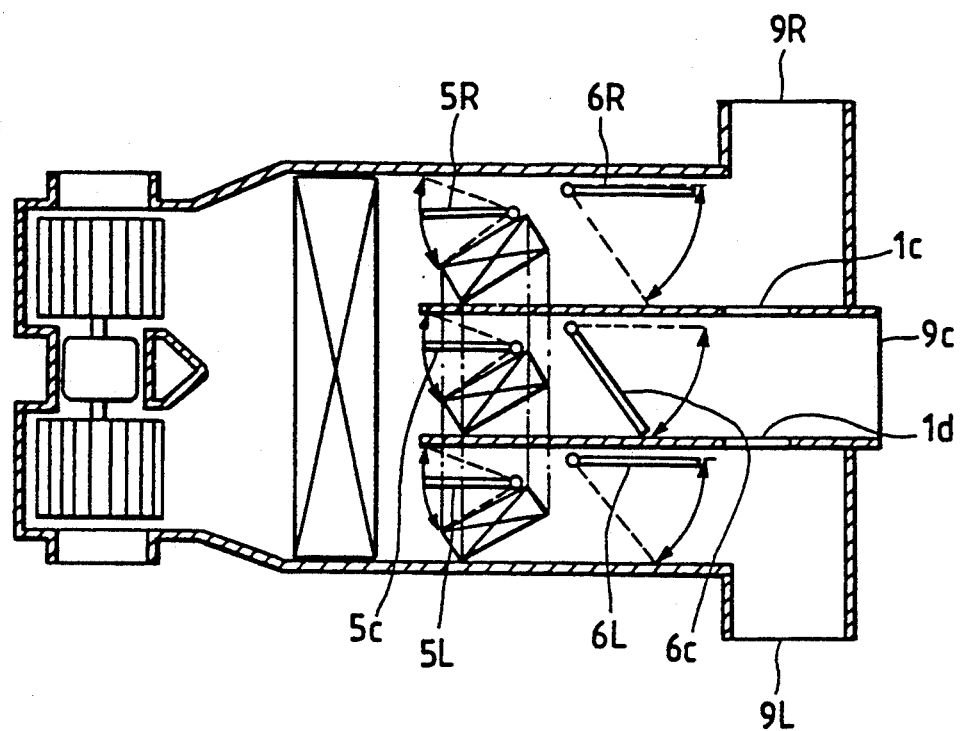
FIGS. 10, 11 and 12 are schematic diagrams showing states of the respective mode doors during the bi-level blow-out operation mode.
Figure 11:
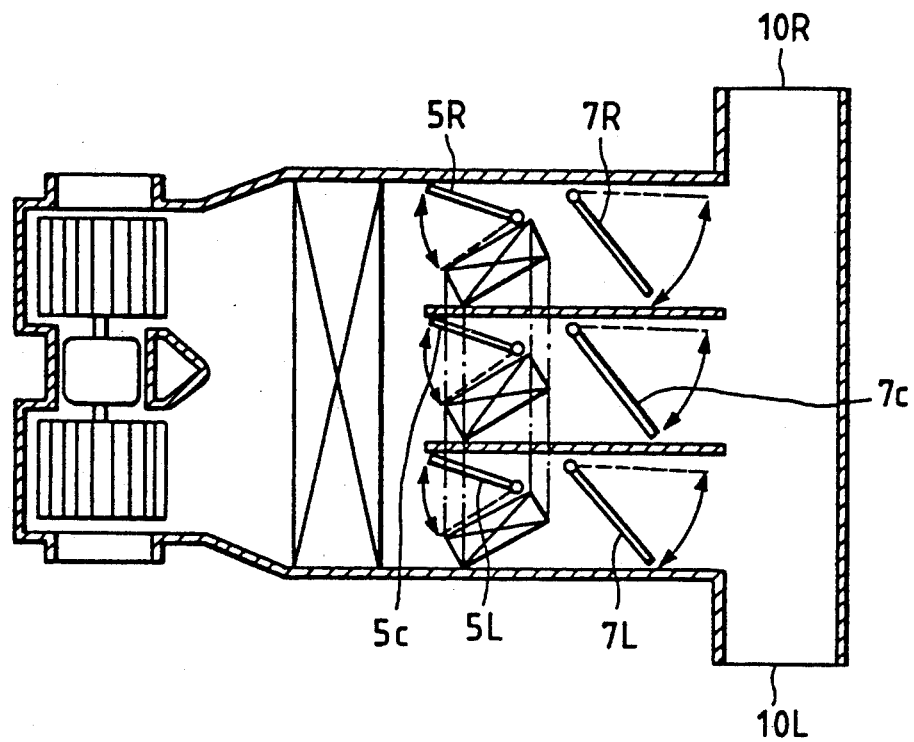
Figure 12:
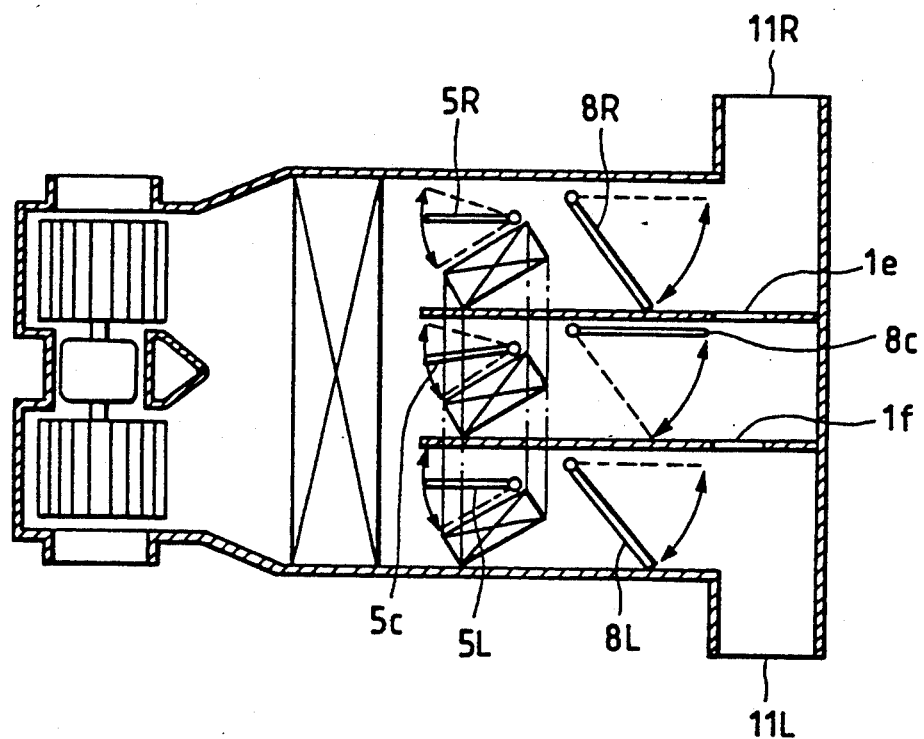

FIGS. 10, 11 and 12 likely show schematic cross-sections of the air conditioner seen from the top thereof and which are prepared for explaining change-over operation by the blow-out port change-over doors leading to the respective blow-out ports during the bi-level blow-out operation mode in which FIG. 10 shows a state where the vent doors 6R, 6L are opened and the vent door 6C is closed, FIG. 11 shows a state where the defroster doors 7R, 7L, 7C are closed, and FIG. 12 shows a state where the floor doors 8R, 8L, are closed and the floor door 8C is opened.

As seen from FIG. 10, at the boundaries between the both side vent blow-out ducts and the center vent blow-out duct, there are provided with bypass passages 1c and 1d thereby during the bi-level blow-out operation mode the conditioned air having average temperature of those of right and left side vent blow-out ports is blown-out from the center vent blow-out port. Further, as seen from FIG. 12, at the boundaries between the both side floor blow-out ducts and the center floor blow-out duct, there are provided with bypass passages 1e and 1f, thereby the conditioned air by the air mix door 5C is blown-out toward the feet of the passengers via the right and left floor blow-out ports. Namely, according to the first embodiment of the present invention, during the bi-level blow-out operation mode the conditioned air temperatures from the right and left vent blow-out ports and from the floor blow-out ports are individually controlled such that a comfortable air conditioning which keeps passenger's heads cool and feet warm can be achieved and further the driver and the passenger next to the driver enable to set their desired blow-out air temperatures independently.

Figure 13:
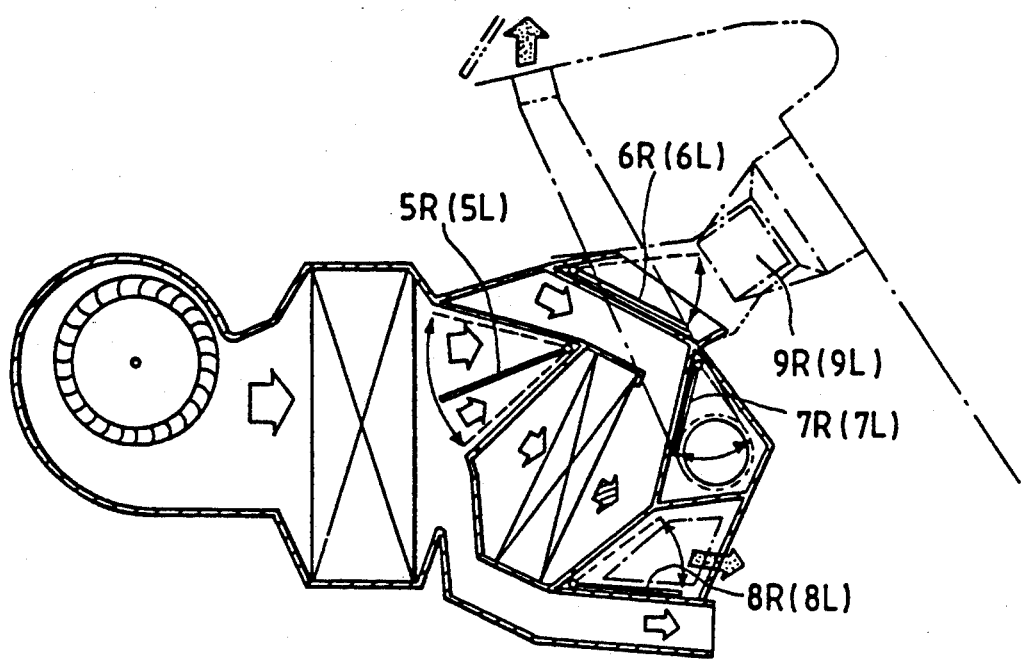
FIG. 13 is a schematic diagram showing air flow in both side air passages of the air conditioner shown in FIG. 1 during heater operation mode.
Figure 14:
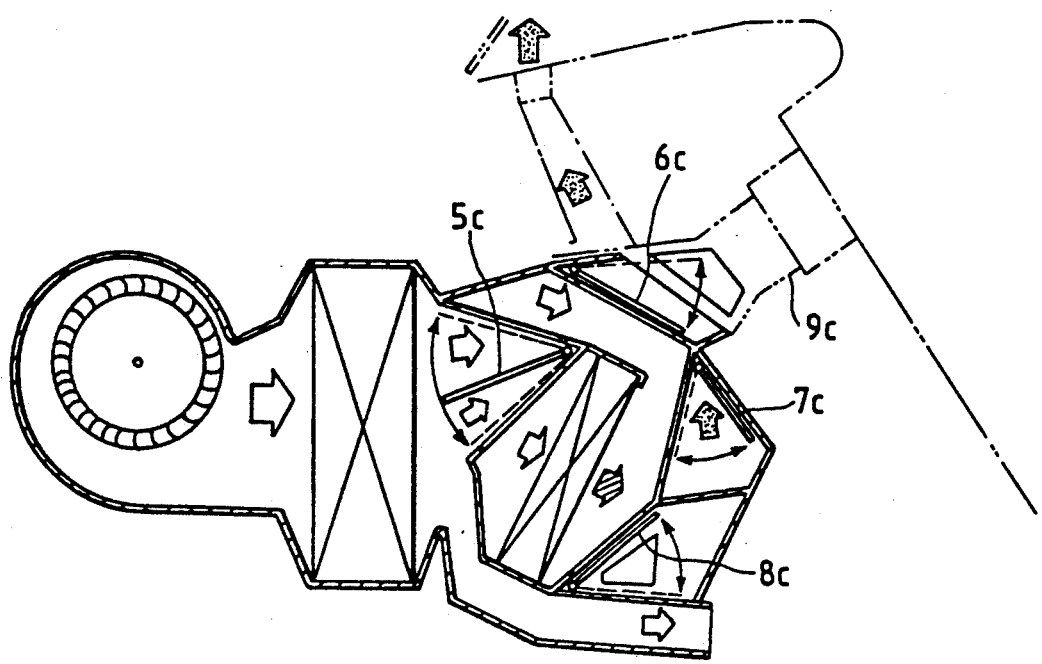
FIG. 14 is a schematic diagram showing air flow in the center air passage of the air conditioner shown in FIG. 1 during the heater blow-out operation mode.

FIGS. 13 and 14 respectively show schematically cross-sections of the side (right and left) and center conditioned air passages seen from their lateral direction during the heater blow-out operation mode in which the vent doors 6R, 6L, 6C are closed, the defroster doors 7R, 7L are closed and the defroster door 7C is opened, and the floor doors 8R, 8L, are opened and the floor door 8C is closed such that the respective blow-out temperatures from the right floor blow-out port, the left floor blow-out port and the defroster blow-out port are individually controlled by the air mix doors 5R, 5L and 5C respectively.

Figure 15:
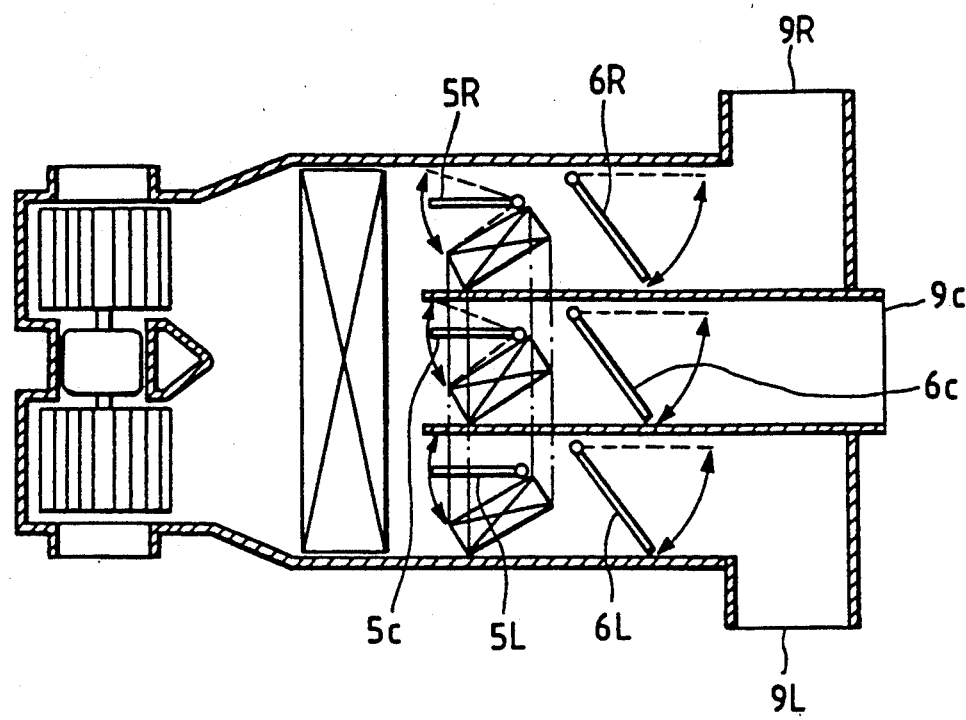
FIGS. 15, 16 and 17 are schematic diagrams showing states of the respective mode doors during the heater blow-out operation mode.
Figure 16:
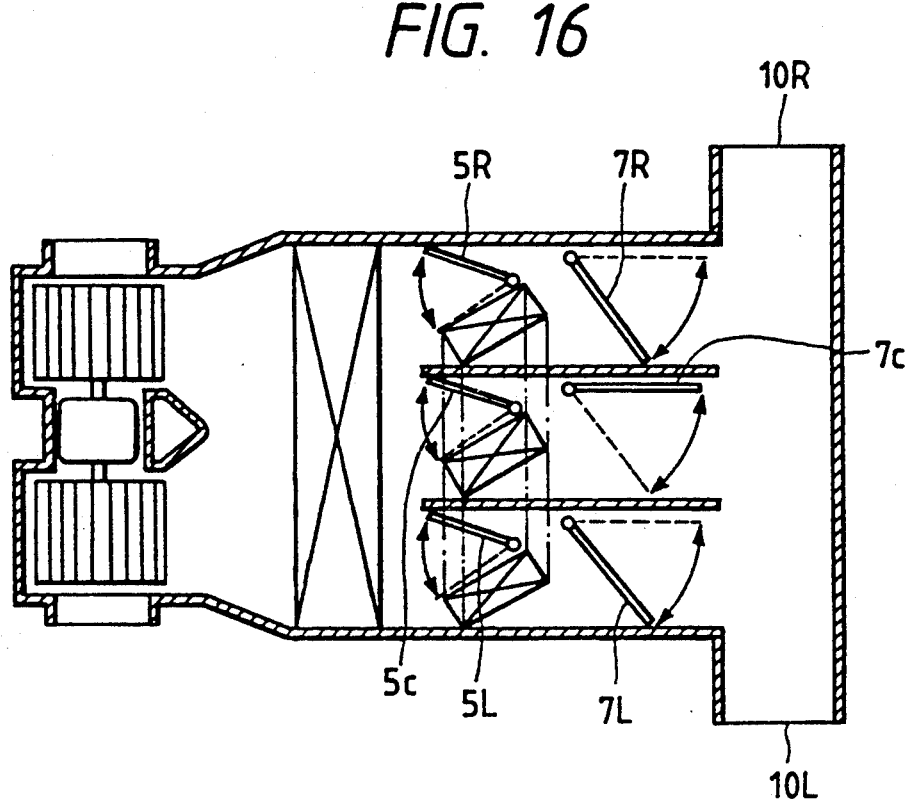
Figure 17:
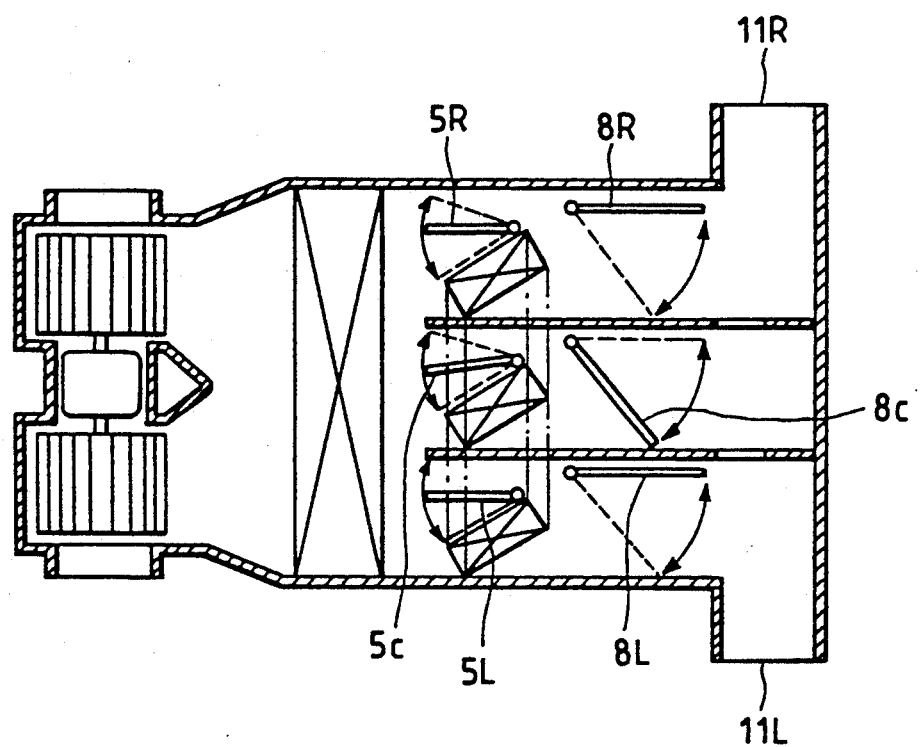

FIGS. 15, 16 and 17 show schematic cross-sections of the air conditioner seen from the top thereof and which are prepared for explaining change-over operation by the blow-out port change-over doors leading to the respective blow-out ports during the heater blow-out operation mode in which FIG. 15 shows a state where the doors 6R, 6L, 6C are closed, FIG. 16 shows a state where defroster doors 7R, 7L, are closed and the defroster door 7C is opened, and FIG. 17 shows a state where the floor doors 8R, 8L are opened and the floor door 8C is closed.

In the heater blow-out operation mode according to the first embodiment of the present invention, the blow-out air temperatures from the right and left floor blow-out ports and from the defroster blow-out port are individually controlled such that a comfortable air conditioning keeping the passenger's head cool and feet warm and independent setting of desired blow-out the temperatures of both the driver and the passenger next to the driver are enabled.

Figure 18:
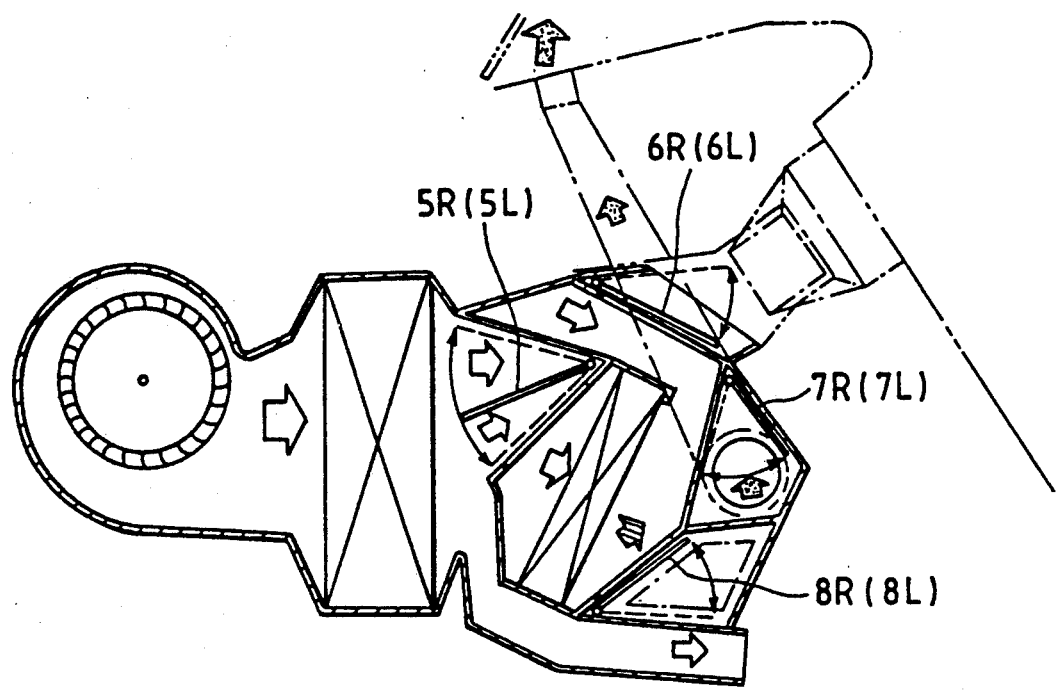
FIG. 18 is a schematic diagram showing air flow in both side air passages of the air conditioner shown in FIG. 1 during defroster blow-out operation mode.
Figure 19:
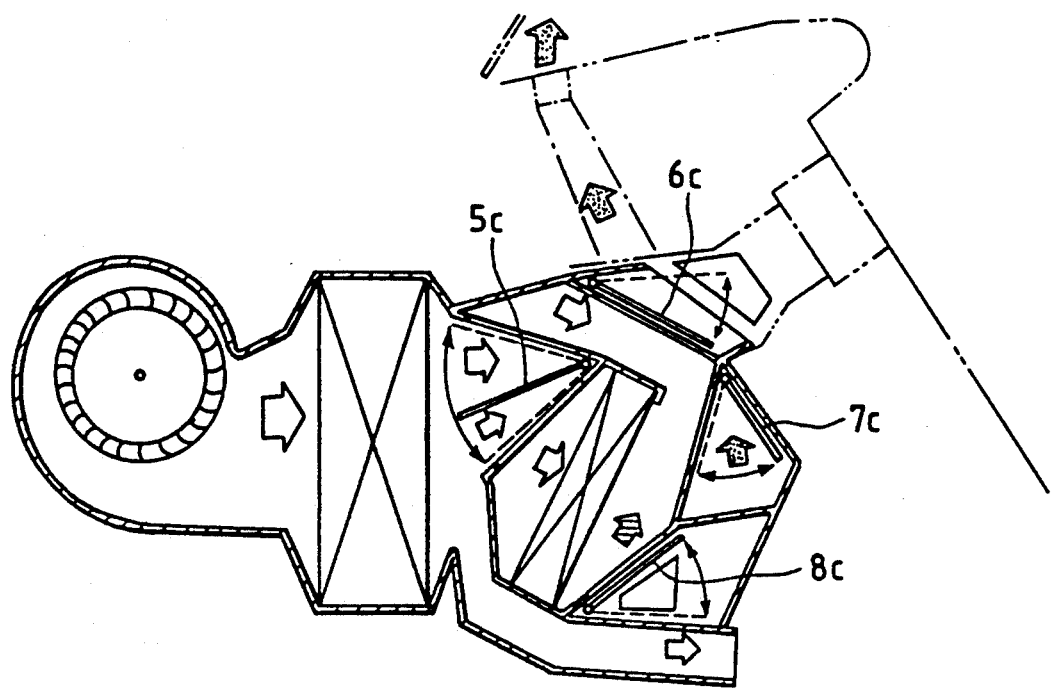
FIG. 19 is a schematic diagram showing air flow in the center air passage of the air conditioner shown in FIG. 1 during the defroster blow-out operation mode.

FIGS. 18 and 19 respectively show schematically cross-sections of the side (right and left) and center conditioned air passages seen from their lateral direction during the defroster blow-out operation mode in which the vent doors 6R, 6L, 6C are opened, the defroster doors 7R, 7L, 7C are opened and the floor doors 8R, 8L, 8C are closed.

Figure 20:
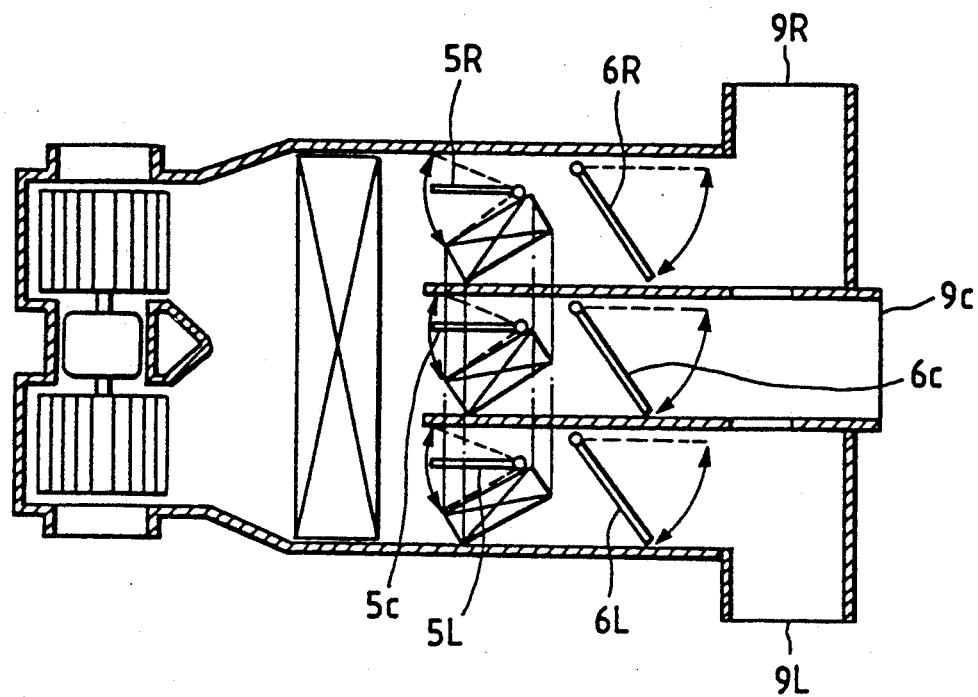
FIGS. 20, 21 and 22 are schematic diagrams showing states of the respective mode doors during the defroster blow-out operation mode.
Figure 21:
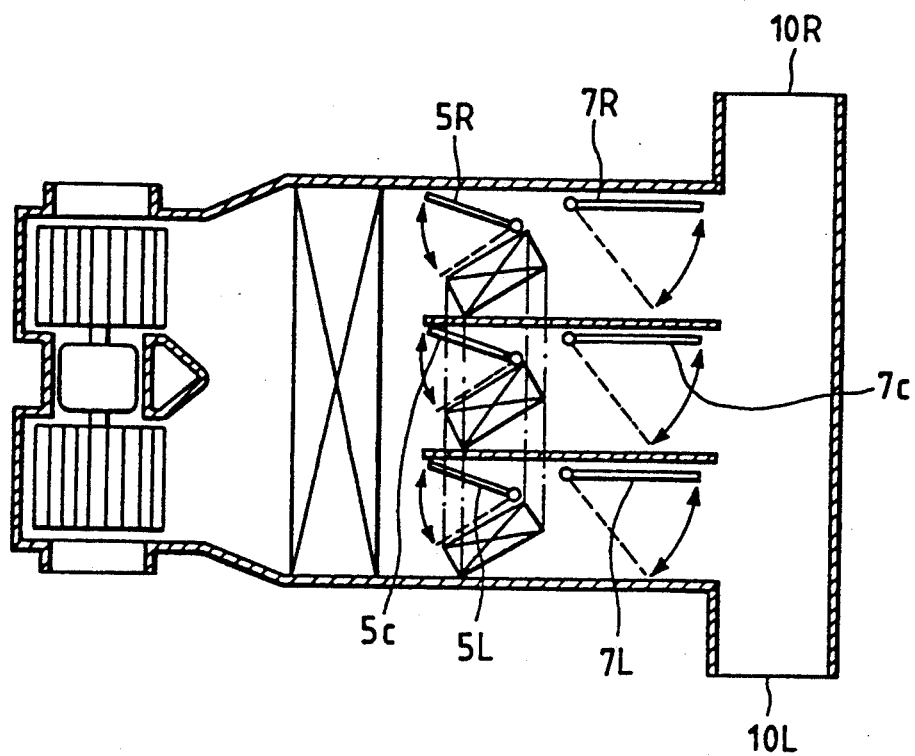
Figure 22:
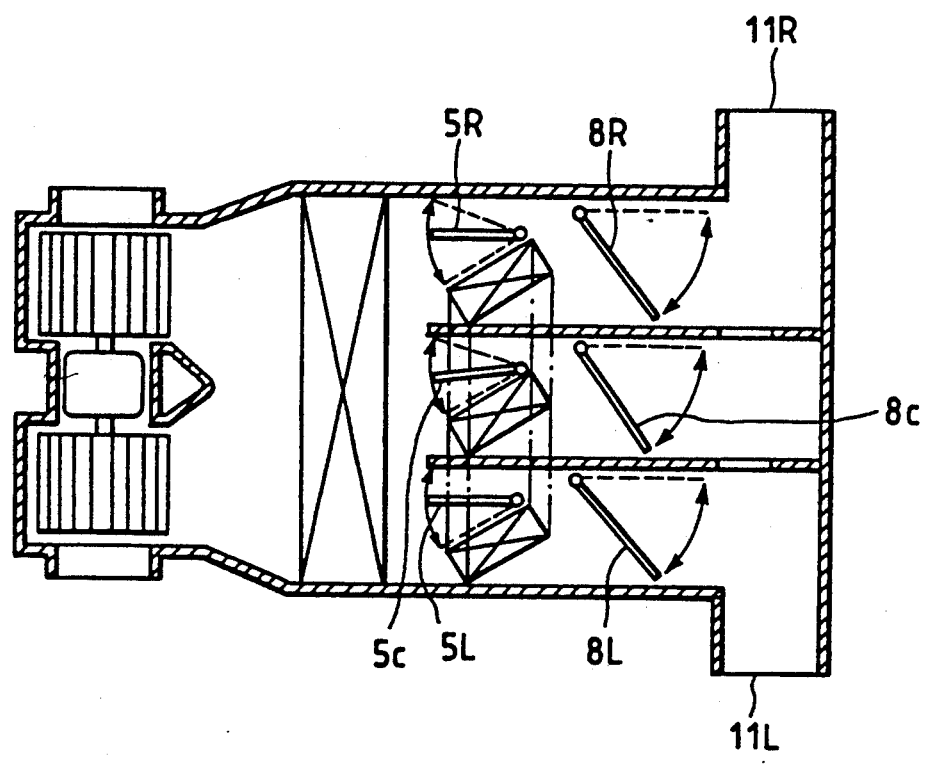

FIGS. 20, 21 and 22 show schematic cross-sections of the air conditioner seen from the top thereof and which a prepared for explaining change-over operation by the blow-out port change-over doors leading to the respective blow-out ports during the defroster blow-out operation mode in which FIG. 20 shows a state where the vent doors 6R, 6L, 6C are closed, FIG. 21 shows a state where the defroster doors 7R, 7L, 7C are closed and FIG. 22 shows a state where the floor doors 8R, 8L, 8C are closed. As seen from FIG. 21, the right, left and center defroster air blow-out passages are merged into a common air blow-out passage, individual control of the defroster air temperature is not performed in the present embodiment, however when the individual temperature control is required, such is easily carried out by modifying the air passage structure to that of the floor blow-out ducts as shown in FIG. 22. Further assuming that the priority in the defroster blow-out operation mode is to defrost the frosted window, the control of the air mix doors are simplied by fixing the air mix doors 5R, 5L at their full hot conditions and by adjusting the air temperature with the air mix door 5C.

Figure 23:
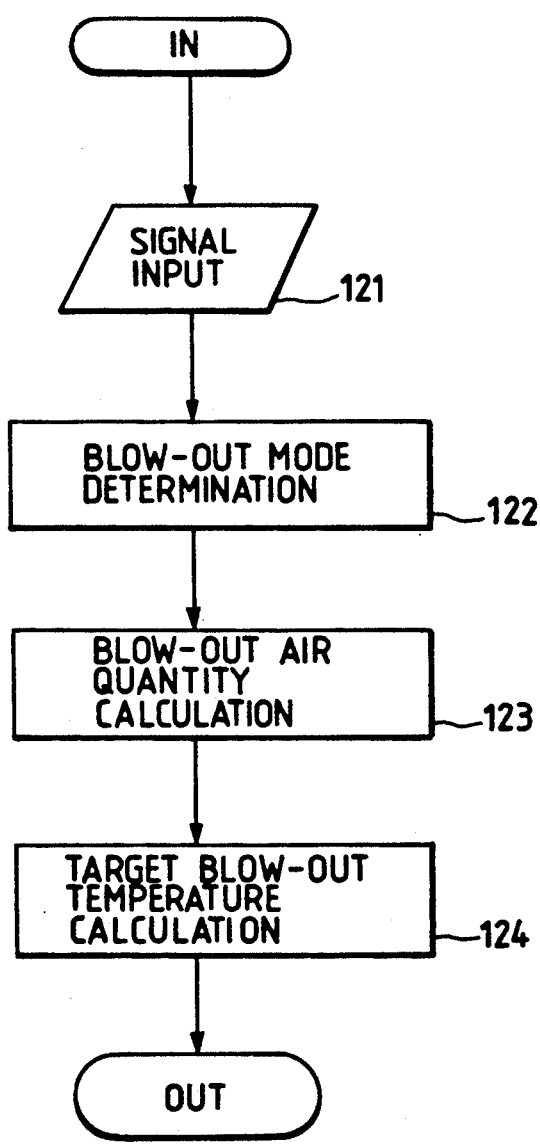
FIG. 23 is a flow chart for explaining the control of the air conditioner shown in FIG. 1.
Figure 24:
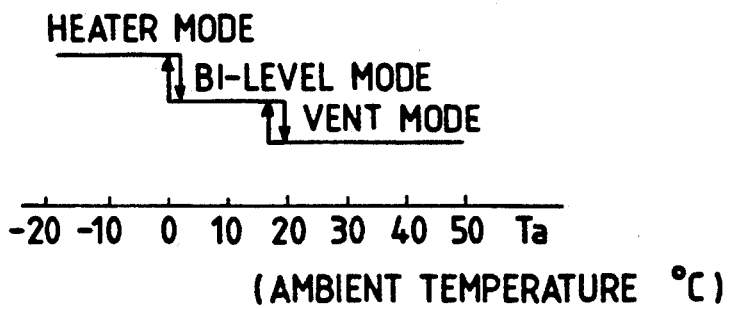
FIG. 24 is a graph showing a relationship between the operation modes of the air conditioner shown in FIG. 1 and ambient temperature.
Figure 25:
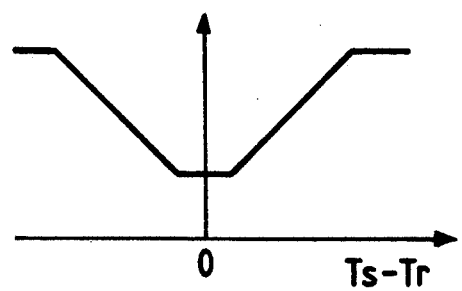
FIG. 25 is a graph showing a relationship between applied voltage of a blower motor used in the air conditioner shown in FIG. 1 and temperature difference between set temperature and cabin temperature.
Figure 26:
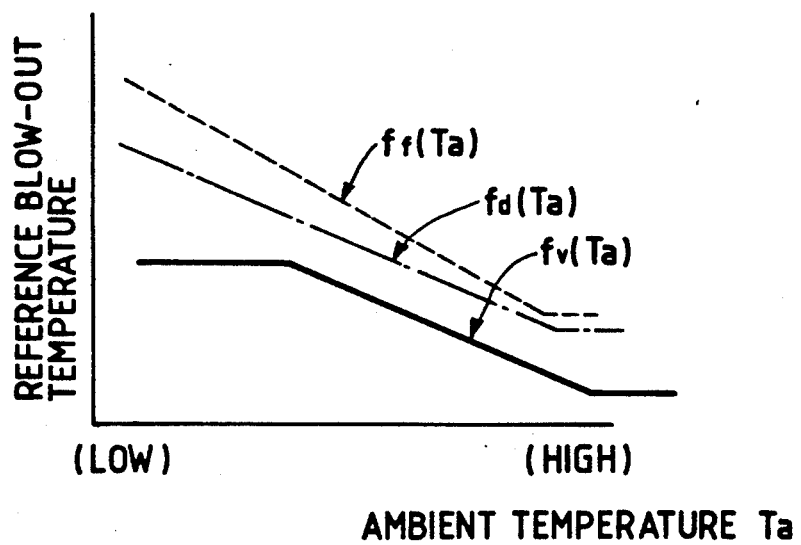
FIG. 26 is a graph showing a relationship between reference blow-out temperature from respective blow-out ports and ambient temperature.

Now, an example of controls of the first embodiment of the air conditioner according to the present invention will be explained. FIG. 23 shows a flow chart for explaining the blow-out air temperature control performed with the above air conditioner via the control unit 100. Once the microcomputer 101 is rendered operative, the routine of the air conditioner temperature control program shown in the flow chart is performed in a period every hundreds mm sec. At first in input step 121, a signal Ta from the ambient temperature sensor 111, a signal Tr from the cabin temperature sensor 112, a signal Zm from the radiation sensor 113, a signal Tdd from the defroster duct sensor 114, signals $T_{dvR}$, $T_{dvL}$, $T_{dvC}$ from the right side vent blow-out air temperature sensor 115R, the left side vent blow-out air temperature sensor 115L and the center vent blow-out air temperature sensor 115C, and signals $T_{dfR}$, $T_{dfL}$ from the right floor blow-out air temperature sensor 116R and the left floor blow-out air temperature sensor 116L are input into the microcomputer 101 via the A/D converter 103, and the signals $T_{SR}$, $T_{SL}$ from the temperature setter 117R at the driver seat and from the temperature setter 117L at the seat next to the driver seat, a signal M from the mode setter 118 and signal Q from the blower motor speed setter 119 are also input into the microcomputer 101. Thereafter, the process proceeds to step 122 for judging a proper blow-out operation mode. In this judgement step 122, when the mode setting unit 118 has been set at a specific blow-out mode, the microcomputer 101 sends out a control signal to the actuator 27 in response to the mode signal M to change-over the mode doors to select blow-out ports corresponding to the specific set blow-out mode. When the mode setting unit 118 has been set at automatic mode, the microcomputer 101 selects one of the blow-out modes with reference to the predetermined characteristic between blow-out mode and ambient temperature as shown in FIG. 24 and in the same way sends out a control signal to the actuator 27 in response to the selected blow-out mode to change-over the mode doors to select blow-out ports corresponding to the selected blow-out mode. As seen from FIG. 24 a blow-out mode is determined in such a manner that when the ambient temperature is high the vent blow-out mode is selected, when an intermediate season the bi-level blow-out mode is selected and when the ambient temperature is low the heater blow-out mode is selected. With this method a stable blow-out port change-over control is realized even if the right and left side temperatures are separately set. Thereafter the process proceeds to blow-out air quantity calculation step 123 wherein when the blower speed setting unit 119 has been set at a specific blow-out air quantity, the microcomputer sends out a control signal to the driving circuit 28 in response to the air quantity signal Q to drive the blower motor 2 accordingly, and when the blower speed setting unit 119 has been set at automatic mode the microcomputer 101 calculates the deviation between the average $T_S(T_{SR}/2+T_{SL}/2)$ of the set signal $T_{SR}$ from the temperature setting unit 117R at the driver seat and the set signal $T_{SL}$ from the temperature setting unit 117L at the seat next to the driver seat and the signal $T_r$ from the vehicle cabin temperature sensor and determines an applied voltage to the blower motor based upon the calculated deviation and with reference to the predetermined characteristic between blower motor applied voltage and the deviation as shown in FIG. 25 and sends out a control signal to the driving circuit representing the determined blow-out motor applied voltage to drive the blower motor 2 accordingly. Thereafter, the process proceeds target blow-out temperature calculation step 124 wherein the target blow-out temperatures at respective blow-out ports are determined with reference to the characteristic between reference blow-out temperature and ambient temperature $T_a$ as shown in FIG. 26 and which are corrected depending upon set temperature and solar ratiation quantities. The formulas (1), (2) and (3) below are used for the target blow-out temperature calculation.

$$T_{dov}=f_v(T_a)+A(T_s-25)-B\,Z_m/660 \quad (1)$$

$$T_{dof}=f_f(T_a)+C(T_s-25)-D\,Z_m/660 \quad (2)$$

$$T_{dod}=f_d(T_a)+E(T_s-25)-F\,Z_m/660 \quad (3)$$

Wherein, $T_{dov}$: target blow-out air temperature from vent ports in general term which includes the target blow-out air temperature of the right side vent port $T_{dovR}$, target blow-out air temperature of the left side vent port $T_{dovL}$ and target blow-out air temperature of the center vent $T_{dovc}$ ($T_{dovR}/2+T_{dovL}/2$), $T_{dof}$: target blow-out air temperature from the floor ports in general term which includes target blow-out air temperature of the right side floor port $T_{dofR}$ and target blow-out air temperature of the left side floor port $T_{dofL}$, $T_{dod}$: target blow-out air temperature from the defroster port, $f_v(T_a)$: reference blow-out air temperature from the vent ports determined with reference to the characteristic curve shown in FIG. 26, $f_f(T_a)$: reference blow-out air temperature from the floor ports determined with reference to the characteristic curve shown in FIG. 26, $f_d(T_a)$: reference blow-out air temperature from the defroster port determined with reference to the characteristic curve shown in FIG. 26, A, B, C, D, E, F: constants determined based upon thermal load characteristics in and outside the vehicle and the specification of the air conditioner in use, $T_S$: average temperature setting signal ($T_{SR}/2+T_{SL}/2$) of the signal $T_{SR}$ from the right side temperature setting unit and of the signal $T_{SL}$ from the left side temperature setting unit, and $Z_m$: solar radiation quantity signal from the solar radiation sensor.

As explained above, according to the first embodiment of the present invention, each of the divided conditioned air passages is led to the associated vent below-out port, defroster blow-out port and the floor blow-out port, comfortable amount of conditioned air can be blown out into the cabin from the upper and/or lower blow-out ports and right and left blow-out ports via the limited conditioned air passages by individually controlling the respective blow-out port change-over doors, thereby both the driver and the passengers can enjoy the comfortable conditioned air.

Further, according to the first embodiment of the present invention, the respective blow-out port change-over doors are selectively actuated in response to the thermal load condition in and outside the vehicle cabin, thereby the distribution of the conditioned air temperature and of the conditioned air current in the cabin can be locally adjusted.

Still further, when one more conditioned air passage which is to be used for the passangers on the rear seats is added to the air conditioner of the first embodiment, with the modified air conditioner comfortable conditioned air for the respective passengers can be easily provided without installing another air conditioner for the rear seat passangers.

Moreover the center vent blow-out port is arranged in linear relation with the air blow-out direction of the blower, the contitioned air flows in symmetric manner with respect to the center vent blow-out port thereby equalizing amount of conditioned air flowing into the right and left side vent blow-out ports which is very advantageous in view of product design.

In summary, according to the first embodiment of the present invention, individual conditioned air temperature control of the upper and lower and right and left blow-out ports is enable with the combination of the limited conditioned air passages in response to a selected blow-out mode, and thereby comfortable conditioned air for both the driver and passengers is obtained without increasing the manufacturing cost of the air conditioner. Further as indicated above, the center vent blow-out port is arranged in linear relation with respect to the air blow-out direction from the blower, the conditioned air flows in symmetric manner with respect to the center vent blow-out port to thereby equalize the amount of conditioned air flowing into the right and left vent blow-out ports. Accordingly no guide vane for air guide and throttle butterfly in the passages are required and small flow resistance is achieved even with the conditioned air of high flow rate, as a result an air conditioner with low noise is provided.

Second embodiment of an air conditioner according to the present invention is explained with reference to FIG. 27 through FIG. 32.

The air conditioner of the second embodiment is likely adapted to be controlled by a motor vehicle mounted microcomputer which performs digital processing operation according to predetermined software control programs.

Figure 27:
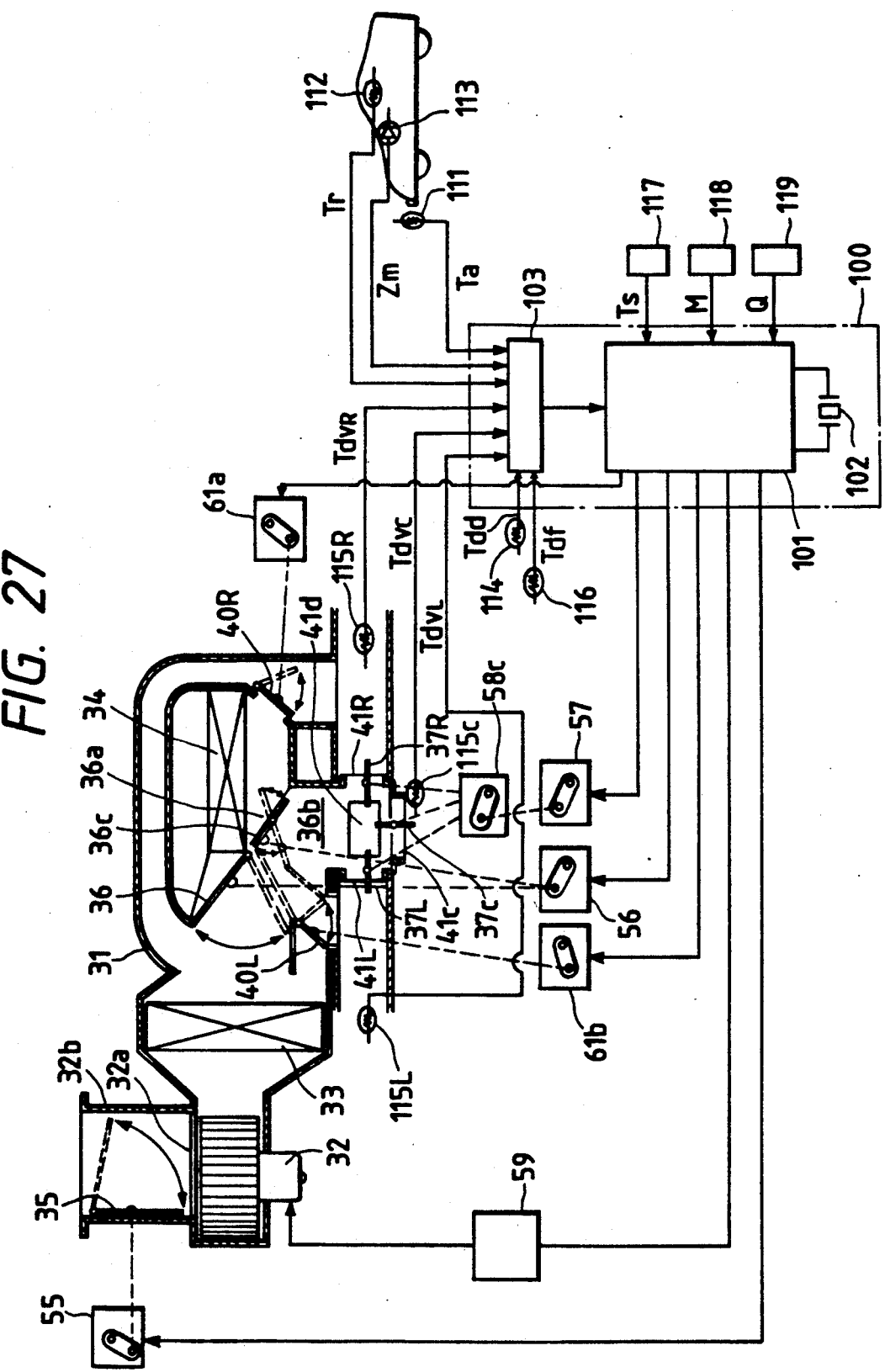
FIG. 27 is a schematic diagram of an air conditioner for a motor vehicle showing second embodiment according to the present invention.

In FIG. 27, numeral 31 is a duct casing which accommodates several units in the air conditioner, in the duct casing 31 a blower motor 32, an evaporator 33 and a heater 34 are arranged along the air flow direction in this order. To an air inlet port 32a of the blower motor 32 an air intake box 32b is attached which is provided with an intake door 35. An air mix door 36 is disposed adjacent to the heater core 34, the air mix door 36 adjusts the mixture ratio of cool air bypassing the heater core 34 and warm air passed through the heater core 34 and regulates the blow-out air temperature into the cabin. Between a warm air passage 36a downstream of the heater core 34 and a main air passage 36b a warm air shut off door 36c is disposed. In the full cool mode as shown in FIG. 27, the main air passage 36b is completely isolated from the heater core 34 by the closure of the warm air shut off door 36c.

The conditioned air of which temperature is adjusted by regulating the mixture ratio of the cool and warm air with the air mix door 36 passes through the main air passage 36b and flows out respectively into a center vent blow-out port 41C, a right side vent blow-out port 41R, left side vent blow-out port 41L, defroster blow-out port 41d and right side floor blow-out port and left side floor blow-out port not shown each provided in the duct casing 31. At respective blow-out ports, a center vent door 37C, right side vent door 37R, left side vent door 37L and a defroster door and floor doors not shown are respectively arranged, and with combination of open and close of these mode doors above blow-out ports meeting the requirements are selected. Further, to these blow-out ports, as seen from FIG. 28, a center vent duct 60C, right side vent duct 60R and left side vent 60L and a defroster duct and floor duct not shown are respectively connected and to the other ends of the respective ducts a center vent blow-out port, right side vent blow-out port, left side vent blow-out port, and a defroster blow-out port and right and left floor blow-out ports which blow-out the conditioned air into the cabin are provided.

Figure 28:
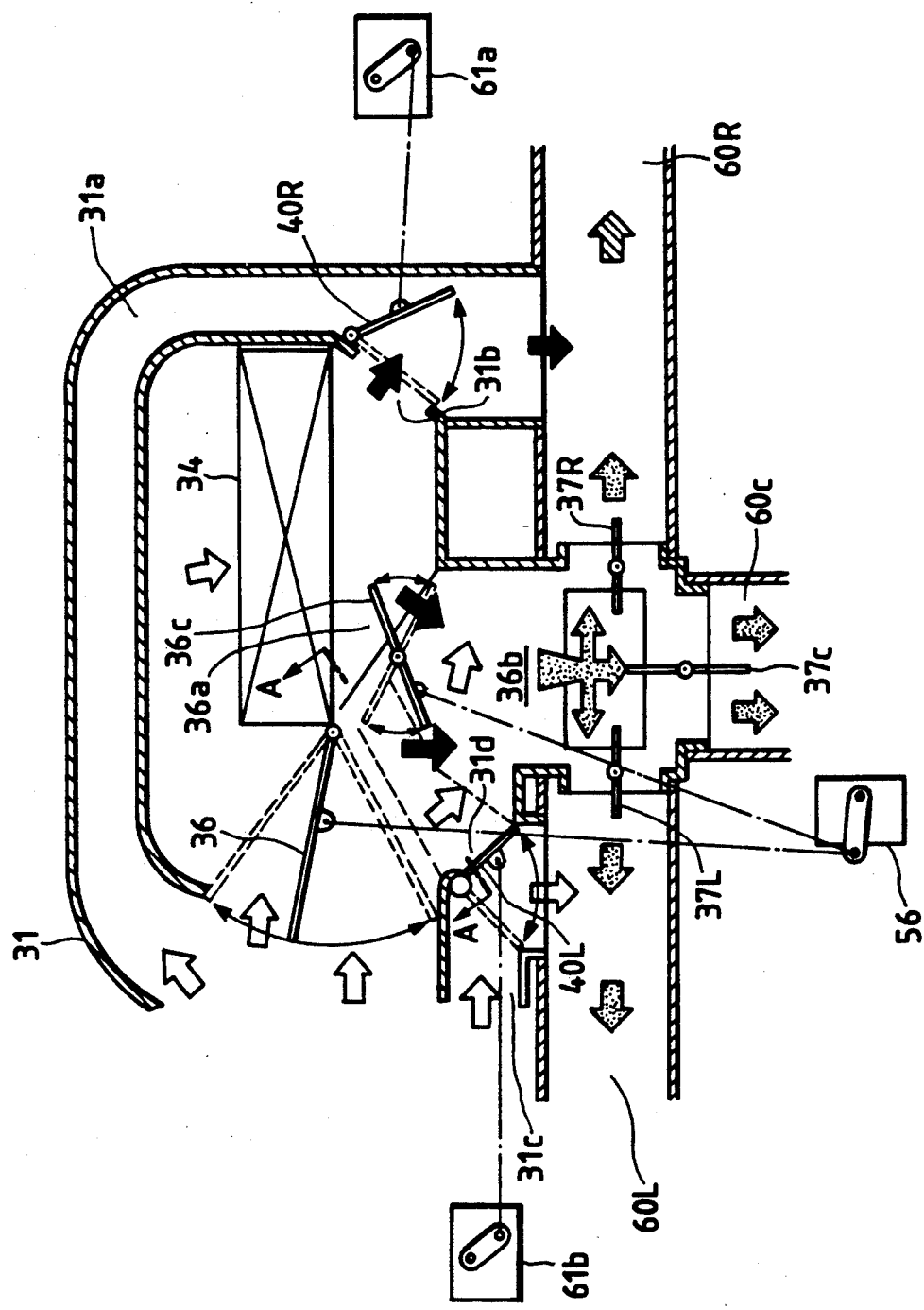
FIG. 28 is an enlarged view of a major part of the air conditioner shown in FIG. 27.
Figure 29:
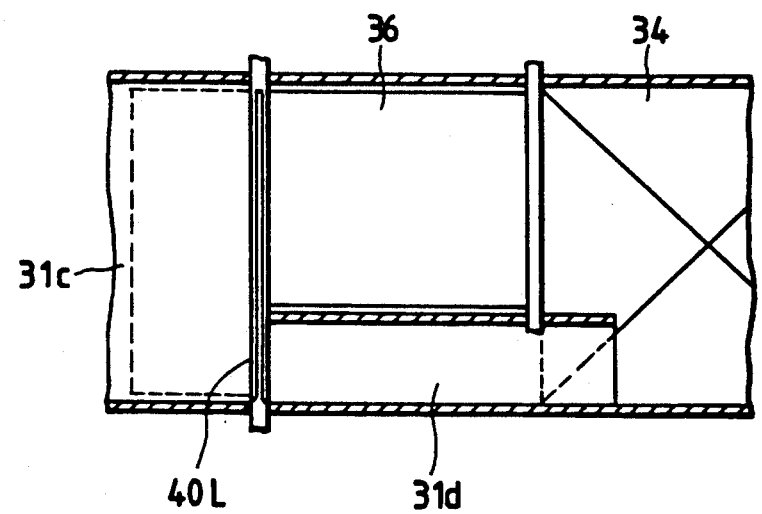
FIG. 29 is a cross sectional view of the air conditioner taken along the line A—A in FIG. 28.

Still further, as seen from FIG. 28 and FIG. 29, the duct casing 31 is provided with a cool air bypass passage 31a, which introduces the cool air from the upstream of the air mix door 36 to the right side vent duct 60R, a warm air bypass passage 31b which joins the warm air from the downstream of the heater core 34 into the cool air bypass passage 31a leading to the right side vent duct 60R, a cool air bypass passage 31c which introduces the cool air from the upstream of the air mix door 36 to the left side vent duct 60L and a warm air bypass passage 31d which joins the warm air from the downstream of the heater core 34 into the cool air bypass passage 31c leading to the left side vent duct 60L. At the respective junctures between the cool air bypass passage 31a and warm air bypass passage 31b and between the cool air bypass passage 31c and the warm air bypass passage 31d, temperature control doors 40R and 40L which individually control the blow-out air temperatures respectively from the right and left side vents are disposed and with these temperature control doors 40R and 40L, cool air quantity passing through the cool air bypass passages 31a and 31c and warm air quantity passing through the warm air bypass passages 31b and 31d are regulated. The downstream of the temperature control doors 40R and 40L respectively communicate to the right side vent duct 60R and the left side vent duct 60L.

The control of the air conditioner according to the second embodiment of the present invention is performed by a control unit 100 of which construction and operation are substantially the same as those explained in connection with the first embodiment of the present invention so that explanation thereof is omitted.

Detected signals from the ambient temperature sensor 111, the cabin temperature sensor 112, the solar radiation sensor 113, the defroster blow-out air temperature sensor 114, the center vent blow-out air temperature 115C, the right side vent blow-out air temperature sensor 115R, the left side vent blow-out air temperature sensor 115L and the floor blow-out air temperature sensor 116 are converted into digital signals via the A/D converter 103 and are input to the microcomputer 101. The center vent blow-out air temperature sensor 115C is disposed in the center vent duct 60C, the right side vent blow-out air temperature 115R is in the right side vent duct 60R and the left side vent blow-out air temperature sensor 115L is in the left side vent duct 60L respectively. Further the set signals in digital form from the temperature setting unit 117, the mode setting unit 118 and the air quantity setting unit 119 are input to the microcomputer 101.

The microcomputer 101 performs all kinds of calculations and decisions based upon the above detected signals and set signals and generates all kinds of instruction signals for controlling the blower motor 32, the intake door 35, the air mix door 36, the warm air shut off door 36c, the center vent door 37C, the right side vent door 37R, the left side vent door 37L, the defroster door (not shown), the floor doors (not shown) and the temperature control doors 40R and 40L.

The intake door 35 is driven by an actuator 55, the air mix door 36 and the warm air shut off door 36c are driven by an actuator 56, and the center vent door 37C, right side vent door 37R, left side vent door 37L and the defroster door and floor doors not shown are driven by an actuator 57 via a link mechanism 58. Further, the blower motor 32 is driven through a driving circuit 59 and the temperature control doors 40R and 40L are respectively driven by actuators 61a and 61b.

The actuator 55 actuates the intake door 35 in response to the instruction signal with regard to intake air from the microcomputer 101 to change-over thereof from internal air to external air or vice versa. The actuator 56 adjusts the opening degree of the air mix door 36 in response to the instruction signal for controlling the opening degree to thereby control the conditioned air temperature, and further actuates the warm air shut off door 36c in association with the air mix door 36 to control the communication between the warm air passage 36a and the main air passage 36b. The actuator 57 actuates through the link mechanism 58 the respective blow-out port change-over doors 37C, 37R, 37L and the defroster door and floor doors not shown in response to the instruction signals with regard to their opening degree from the microcomputer 101 to thereby select the blow-out ports of the conditioned air. The driving circuit 59 continuously controls the rotating speed of the blower motor 32 in response to the instruction signal with regard to the rotating speed from the microcomputer 101.

Further, the actuators 61a and 61b adjust the opening degrees of the respective temperature control doors 40R and 40L in response to the instruction signals for the opening degree control from the microcomputer 101.

Now, when the opening degree of the warm air bypass passage 31b is increased with respect to that of the cool air bypass passage 31a via the temperature control door 40R for the right side vent, the warm air is mixed into the conditioned air of which temperature has been adjusted by the air mix door 36 so that the blow-out air temperature into the cabin passing through the right side vent duct 60R is increased higher than that passing through the center vent duct 60C.

Likewise, when the opening degree of the cool air bypass passage 31c is increased in comparison with that of the warm air bypass passage 31d via the temperature control door 40L for the left side vent, the cool air is mixed into the conditioned air of which temperature has been adjusted by the air mix door 36 so that the blow-out air temperature into the cabin passing through the left side vent duct 60L is decreased lower than that passing through the center vent duct 60C.

As will be apparent from the above explanation, by actuating the temperature control doors 40R and 40L the blow-out air temperature from right and left side vent blow-out ports into the cabin is individually adjusted over a wide range from a high temperature to a low temperature.

Like the first embodiment, the refrigeration cycle control system to be connected to the evaporator 33 and the warm water control system to be connected to the evaporator 33 and the warm water control system to be connected to the heater core 34 are omitted in FIG. 28, because such are not directly related to the present embodiment and are not necessary for explaining the present embodiment.

The blow-out air temperature control of the air conditioner of the second embodiment proceeds substantially the same manner as in the first embodiment and follows the operation sequence shown in the flow chart in FIG. 23.

The operations of the second embodiment air conditioner in steps 121, 122, 123 in the flow chart are substantially the same as those of the first embodiment, the explanation thereof is omitted.

Hereinbelow the target blow-out temperature calculation step 124 with the second embodiment air conditioner is explained in which the center vent blow-out temperature is utilized as a reference for controlling the right and left side vent blow-out temperatures.

In step 124, the respective target blow-out air temperatures $T_{dovR}$, $T_{dovL}$ and $T_{dovC}$ from the right side, left side and center vent blow-out ports are determined based upon reference blow-out temperatures from the vent blow-out ports which are corrected depending upon set temperatures, solar radiation quantity and deviation between set temperature and cabin temperature.

Figure 30:
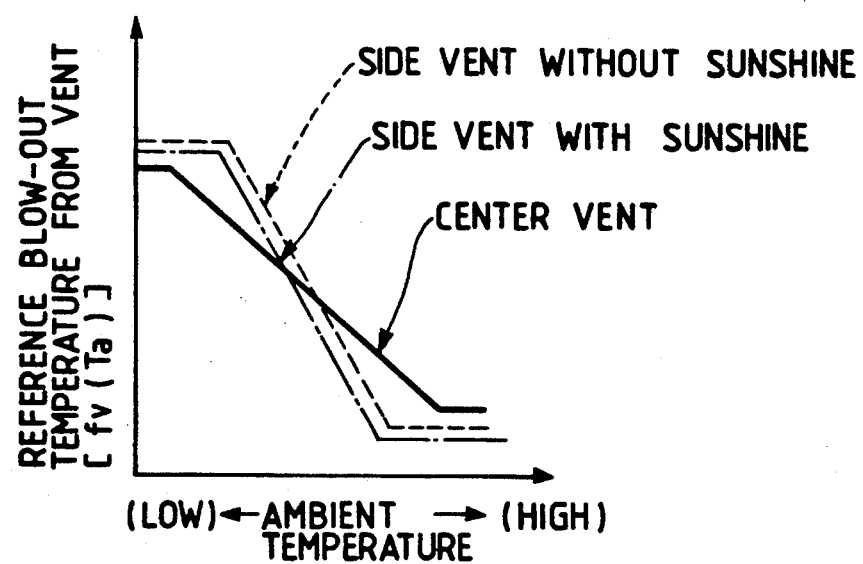
FIG. 30 is a graph showing a relationship between reference blow-out temperature from side and center blow-out ports and ambient temperature.

The reference blow-out temperatures from the vent are shown in FIG. 30. The characteristic curve of the reference blow-out temperature from the center vent in FIG. 30 is equivalent to that shown in FIG. 26. The reference blow-out temperature from side vent is determined with reference to the reference blow-out temperature from center vent, in that, in summer time having a high ambient temperature the reference blow-out temperature is determined somewhat lower and in winter time having a low ambient temperature the reference blow-out temperature is determined somewhat higher as shown in FIG. 30. Further the reference blow-out temperature is determined by taking into account of the radiation heat from the vehicle side walls. Still further, even under the same ambient temperature, the reference blow-out temperature from the side vent without sunshine is determined higher than that with sunshine, in that, through the detection of sunshine with the solar radiation sensor 113, the reference blow-out temperature from the side vent at the side with sunshine is reduced depending upon solar radiation quantity.

Methods of detecting solar radiation quantity and sunshine incident direction are for example disclosed in JP-A-61-286810(1986), an example of which is explained later.

The correction of the reference blow-out temperature depending upon the solar radiation quantity is performed with a correction formula expressed by $-(B \cdot Zm/660)$ wherein B is a constant which varies depending upon distance between passenger and vehicle window and area of the window and is absolutely defined for respective vehicle models and Zm is solar radiation quantity detected by the solar radiation sensor 113.

The following formulas (4), (5) and (6) are used for determining the target blow-out temperatures $T_{dovR}$, $T_{dovL}$, $T_{dovC}$ for the right side, left side and center vent.

$$T_{dovR} = f_r(Ta)_R + A(T_{SR} - 25) - B\, Z_{mR}/660 + G\Delta T_r \quad (4)$$

$$T_{dovL} = f_r(Ta)_L + A(T_{SL} - 25) - B\, Z_{mL}/660 + G\Delta T_r \quad (5)$$

$$T_{dovC} = f_r(Ta)_c + A(T_{SR}/2 + T_{SL}/2 - 25) - B\, Z_{mC}/660 + G\Delta T_r \quad (6)$$

Wherein, $\Delta T_r = T_s - T_r$, G is a correction coefficient for temperature control, and the other symbols used in the above formulas are the same as those explained in connection with the formulas (1), (2) and (3).

Based upon the targeted blow-out air temperatures for the respective vent blow-out ports obtained from the formulas (4), (5) and (6), and the detected blow-out air temperatures of the respective vent blow-out ports by the blow-out air temperature sensors 115R, 115L and 115C, the control unit 100 controls the air mix door 36 and the temperature control doors 40R and 40L so as to render the deviation thereof to zero.

Accordingly, the blow-out air temperatures from the center vent blow-out port and from the side vent blow-out ports are individually controlled by taking into account of the radiation heat from the vehicle side walls and further the blow-out air temperatures from the right and left side vent blow-out ports are also individually controlled by taking into account of the existence and absence of the solar radiation and thereby comfortable conditioned air for all of the passengers can always be blown out into the cabin.

The blow-out air quantity calculation step 123 has been carried out in response to set signal Q from the air quantity setting unit 119 before the target blow-out air temperature calculation step 124 in above, however blow-out air quantity calculation step 123 may be carried out after the target blow-out air temperature calculation step 124.

Hereinbelow, a method of detecting solar radiation direction and solar radiation quantity with a solar radiation sensor is explained.

Figure 31A:
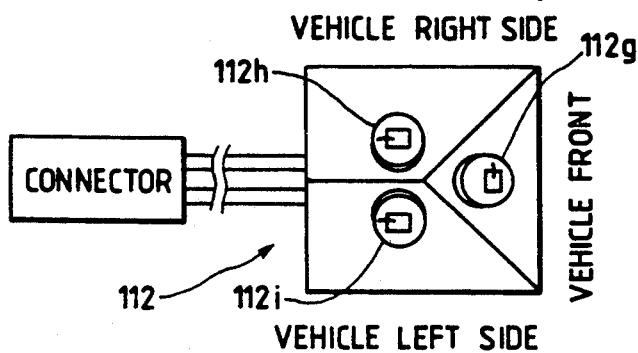
FIGS. 31(a), 31(b) and 31(c) are respectively a top face view, front view and side view of a solar radiation sensor used with the air conditioner shown in FIG. 27.
Figure 31B:
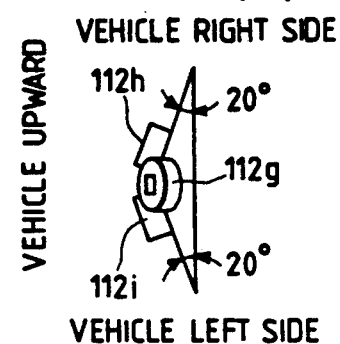
Figure 31C:
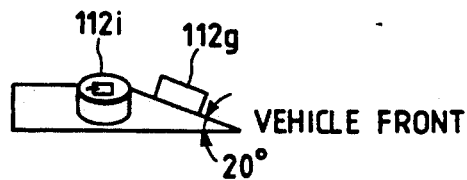

In FIGS. 31(a), 31(b) and 31(c), an example of solar radiation sensors 112 used for the air conditioner in the above embodiment is shown. FIG. 31(a) is a top face view of the solar radiation sensor 112 which is composed of a light receiving element 112h for detecting solar radiation quantity from the right side of the vehicle, a light receiving element 112i for detecting solar radiation quantity from the left side of the vehicle and a light receiving element 117g for detecting solar radiation quantity from the front side of the vehicle. These light receiving elements are mounted respectively on sensor attaching planes which incline by 20°. with respect to horizontal plane as shown in FIGS. 31(b) and 31(c). However the inclination angle is not limited to 20°.

Figure 32A:
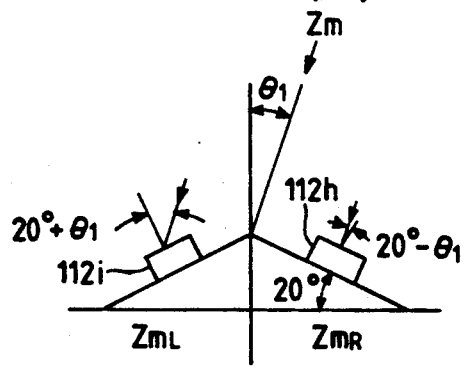
FIGS. 32(a) and 32(b) are respectively views for explaining principle of determining solar radiation direction in the solar radiation sensor.
Figure 32B:
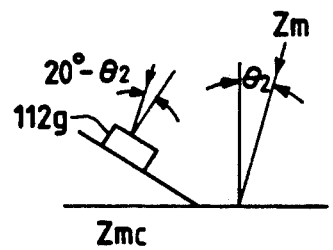

Now, the principle of detecting incident light direction with the solar radiation sensor 112 is explained when assuming that the solar radiation quantity is $Z_m$ and the light comes from the right direction with an angle of $\theta 1$ and from the front direction with an angle of $\theta 2$ as shown in FIGS. 32(a) and 32(b). The solar radiation quantities $Z_{mR}$ and $Z_{mL}$ detected respectively by the light receiving elements 112h and 112i are expressed by the following formulas (7) and (8) as seen from FIG. 32(a);

$$Z_{mR}=Z_m\cdot\cos(20-\theta 1) \quad (7)$$

$$Z_{mL}=Z_m\cdot\cos(20+\theta 1) \quad (8)$$

Further, the solar radiation quantities $Z_{mC}$ detected by the light receiving element 112g is expressed by the following formula (9) as seen from FIG. 32(b);

$$Z_{mC}=Z_m\cdot\cos(20-\theta 2) \quad (9)$$

Accordingly, from the above three formulas (7), (8) and (9), the solar radiation quantities $Z_m$ and light incident angle $\theta 1$ with regard to right and left direction and light incident angle $\theta 2$ from the front direction are determined.

In the air conditioner of the second embodiment according to the present invention, the right and left side vent blow-out air temperatures which are much influenced by solar radiation and ambient temperature are individually controlled so as to cancel out their influences depending upon the thermal load and by making use of the blow-out air temperature from the center vent flow-out port as a reference temperature, thereby, blow-out air temperature and air current distribution in the cabin can be controlled into an optimum state with a good responsiveness providing a comfortable condition for both the passengers on right and left side seats.

Further, the side vent blow-out air temperatures are adjusted with reference to the center vent blow-out air temperature, thereby the blow-out air temperature control of the air conditioner is simplified. Still further the cool and warm air flowing respectively through the auxiliary passages is merely used for fine adjustment of the blow-out air temperature such that complexing of the air conditioner structure is avoided and the manufacture thereof is facilitated.

Third embodiment of an air conditioner according to the present invention is explained with reference to FIG. 33 through FIG. 39.

The air conditioner of the third embodiment is likely adapted to be controlled by a motor vehicle mounted microcomputer which performs digital processing operation according to predetermined soft wear control programs.

Figure 33:
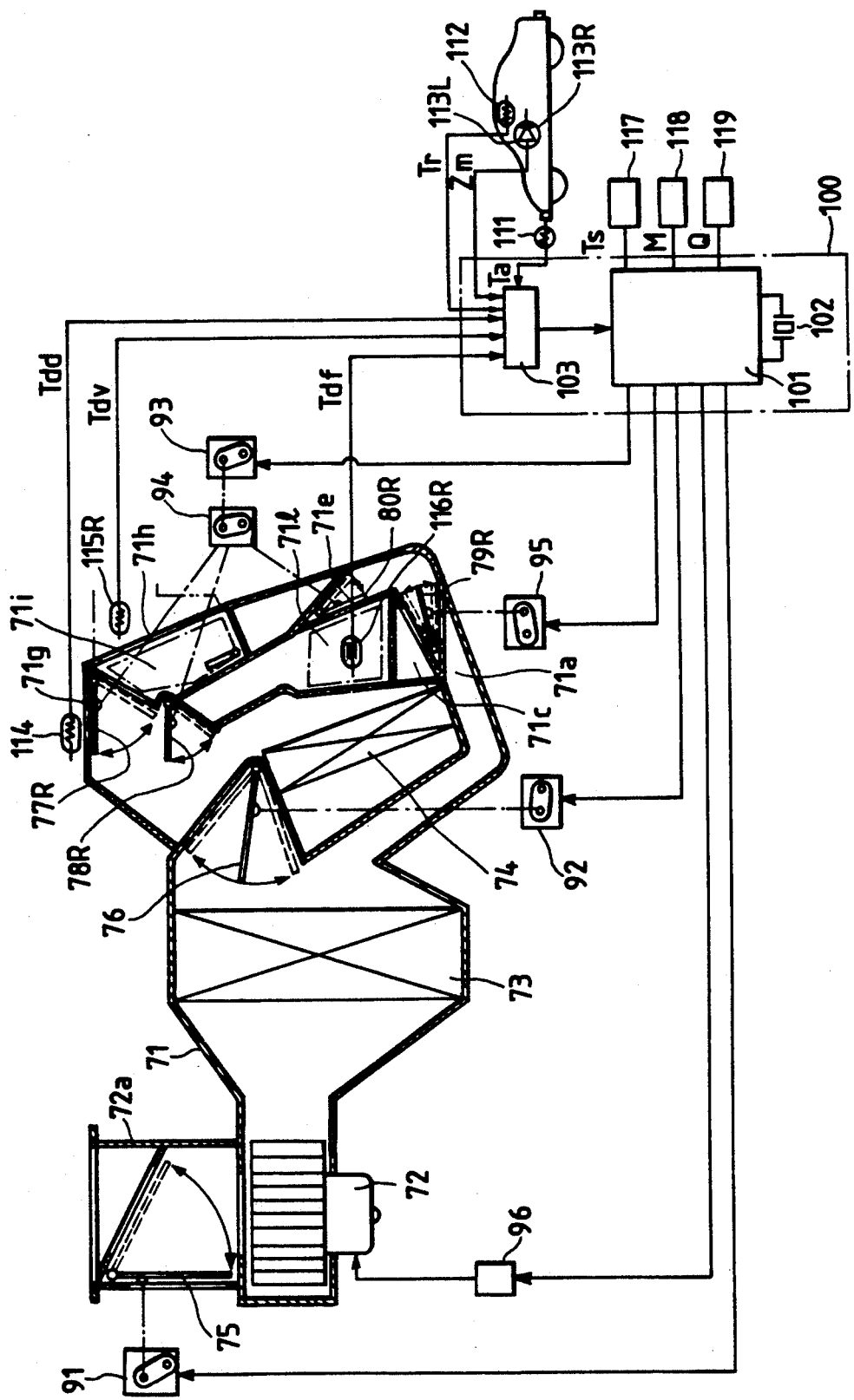
FIG. 33 is a schematic diagram of an air conditioner for a motor vehicle showing third embodiment according to the present invention.
Figure 34:
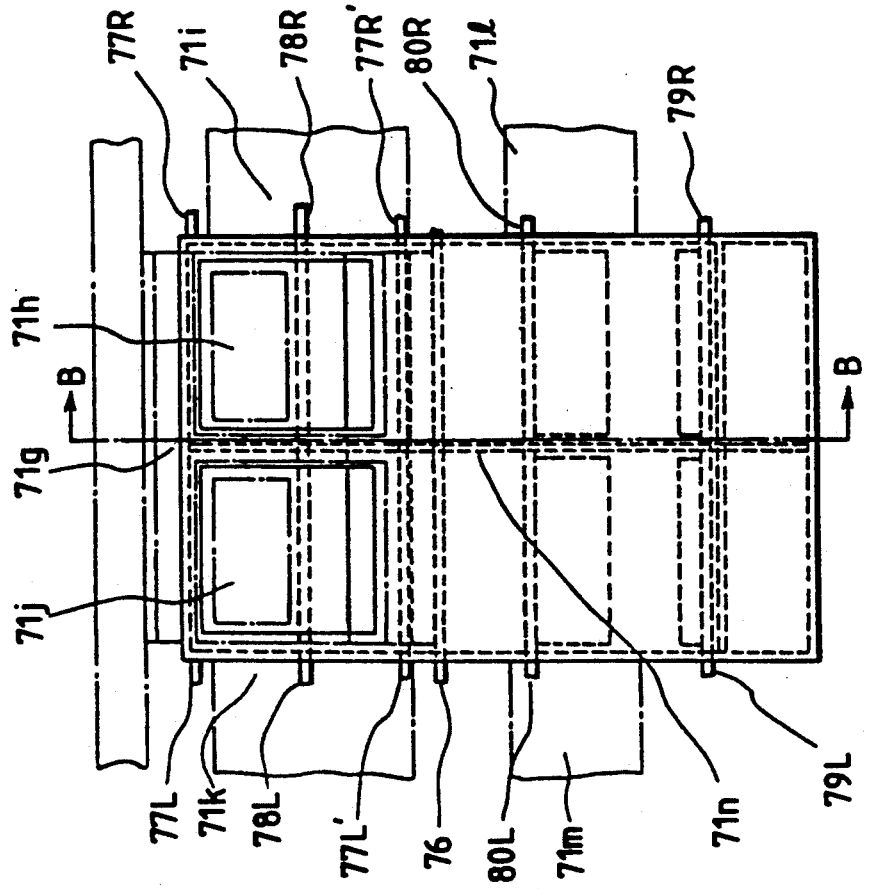
FIG. 34 is a front view of the air conditioner shown in FIG. 33.

FIG. 33 is an overview constitutional diagram showing the third embodiment of the present invention. In FIGS. 33 and 34, 71 is a casing accommodating several units in the air conditioner, and in the casing 71 a blower motor 72, an evaporator 73 and a heater core 74 are arranged from an air inlet port in this order. At the air inlet port of the blower motor 72 an intake box 72a and an intake door 75 are provided which select outer air or inner air to introduce the same into the blower motor 72. 76 is an air mix door which controls the mixture ratio between cool air bypassing the heater core 74 and warm air passed through the heater core 74 to adjust the conditioned air temperature into the cabin. 77R, 77L, 78R and 78L are respectively a right side vent door, left side vent door, right side floor door and left side floor door, via the actuation of the doors 77R, 77L, 78R and 78L which change-over blow-out ports, any blow-out ports depending upon respective desired conditions are selected. 79R is a right side temperature control door which is disposed at the junction between a right side cool air bypass passage 71a and a right side warm air bypass passage 71c and adjusts the mixture ratio of the cool air and the warm air passing through these bypass passages. Further a left side cool air bypass passage 71b and left side warm air bypass passage 71d which do not appear in the drawings constitute a pair with the right side cool and warm air bypass passages 71a and 71c. 71e is an opening leading to a right side floor passage which opens at the right side cool air bypass passage 71a downstream the right side temperature control door 79R and at the juncture between the opening 71e and the right side cool air bypass passage 71a a right side mode control door 80R is disposed. Further, 71f not appeared in the drawings is an opening leading to a left side floor passage which opens at the left side cool air bypass passage 71b downstream the left side temperature control door 79L and at the juncture between the opening 71f and the left side cool air bypass passage 71b a left side mode control door 80L is disposed. Further, 71g is a defroster blow-out port, 71h a right side center vent blow-out port, 71i a right side vent blow-out port, 71j a left side center vent blow-out port, 71k a left side vent blow-out port, 71l a right side floor blow-out port and 71m a left side floor blow-out port. In FIG. 33 apparatus in connection with a refrigerating cycle control system to be connected to the evaporator 73 and a warm water control system to be connected to the heater core 74 are omitted because such are not directly related to the present invention.

The control of the air conditioner according to the third embodiment of the present invention is performed by a control unit 100 of which constitution and operation substantially the same with the first embodiment of the present invention so that explanation thereof is omitted.

Based upon respective detected signals from an ambient temperature sensor 111, a vehicle cabin temperature sensor 112, a solar radiation sensor 113, a defroster blow-out air temperature sensor 114, a right side vent blow-out air temperature sensor 115R, a left side vent blow-out air temperature sensor 115L (not shown), a right side floor blow-out air temperature sensor 116R, a left side floor blow-out air temperature sensor 116L (not shown) which are converted one after another into digital signals via an A/D converter 103, and set signals from temperature setting unit 117, an operation mode setting unit 118 and a blower motor speed setting unit 119, the microcomputer 101 performs several kinds of calculations and decisions and generates signals such as for the intake door 75, air mix door 76, vent doors 77R, 77L, floor doors 78R, 78L, temperature control doors 79R, 79L and mode control doors 80R, 80L.

91 is an actuator for changing-over the intake door in response to instruction signals with regard to internal and external air change-over from the microcomputer 101. 92 is an actuator of opening degree adjustment for controlling fundamental conditioned air blow-out temperature and controls the opening degree of the air mix door 76 in response to instruction signals from the microcomputer 101 with regard to the opening degree control. 93 is an actuator used for blow-out port change-over and actuates the respective blow-out port change-over doors 77R, 77L, 78R, 78L, 80R, 80L in association to thereby select blow-out ports of the conditioned air in response to control signals from the microcomputer 101. 95 is an actuator for actuating the right and left side temperature control doors 79R, 79L in response to control signals from the microcomputer 101. 96 is a driving circuit for the blower motor 72 and controls continuously the rotating speed of the blower motor 72 in response to the control signals from the microcomputer 101.

Now, the separate and individual control of the blow-out air temperatures from the respective blow-out ports in the air conditioner of the third embodiment according to the present invention is explained.

Figure 35:
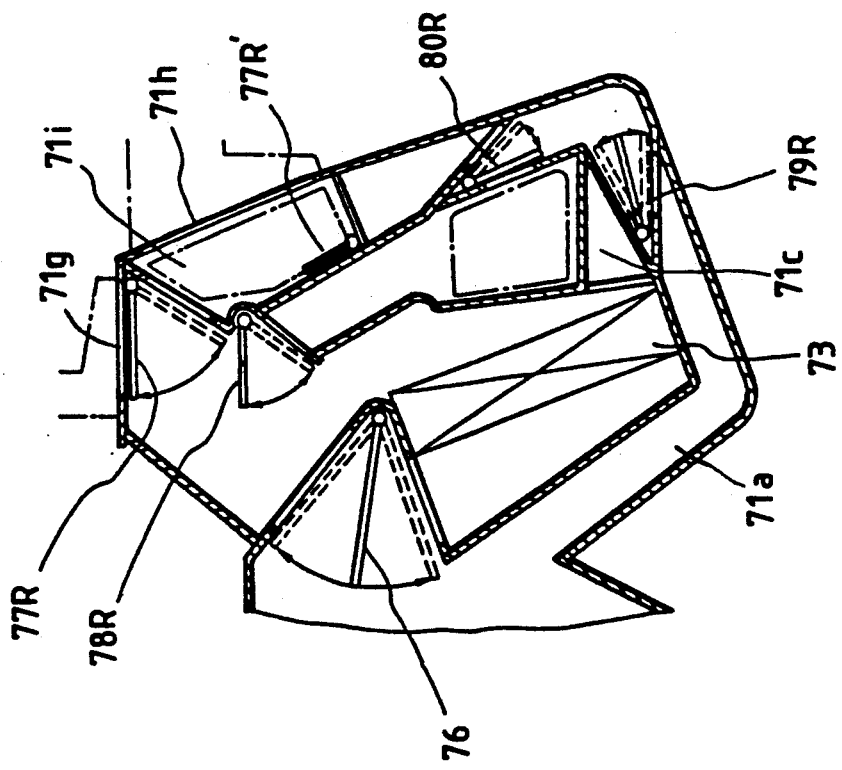
FIG. 35 is a cross-sectional view of the heater unit portion of the air conditioner taken along the line B—B in FIG. 34.

FIG. 34 is a front view of the air conditioner for a motor vehicle seen from inside the cabin of the third embodiment according to the present invention, and FIG. 35 is a cross-section of the heater unit portion which is the major part in connection with the temperature adjusting function thereof.

In FIG. 34, 71n is a partition plate which divides the conditioned air passage downstream the vent doors 77R, 77L and the floor doors 78R, 78L into right and left sides thereby the blow-out air temperature control and the blow-out port change-over into right and left sides are enabled to be individually carried out.

Hereinbelow, operation of the air conditioner of the third embodiment according to the present invention is explained. FIGS. 36, 37, 38 and 39 are views showing air flow in respective blow-out modes, FIG. 36 relates to a vent blow-out mode which is used in summer time having a high ambient temperature, FIG. 37 relates to a bi-level blow-out mode which is used in an intermediate season such as spring and autumn, FIG. 38 relates to a heater mode which is used in winter time having a low ambient temperature, and FIG. 39 shows an air flow state in a defroster mode which is used as an emergency function such as when the windshield is frosted or is frozen.

Figure 36:
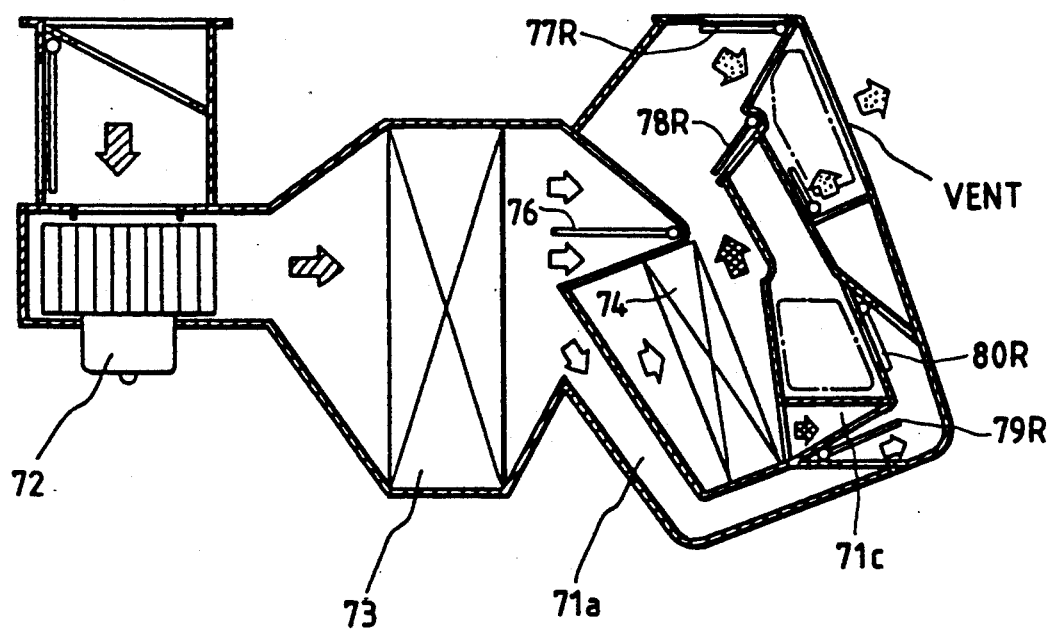
FIG. 36 is a schematic diagram showing air flow in the air conditioner shown in FIG. 33 during vent blow-out operation mode.

At first, FIG. 36 is explained, the air taken in by the blower 72 is dehumidified and cooled at the evaporator 73, the dehumidified, and cooled air is divided into air which passes and bypasses the heater core 74 by controlling the air mix door 76 and thereafter the same are joined again to obtain conditioned air of a desired temperature and to pass the same into the vent blow-out duct, on the other hand, the mixture ratio of the cool air from the upstream of the air mix door 76 passing through the bypass passage 71a; and the warm air from the heater core 74 passing through the bypass passage 71c is controlled with the temperature control door 79R; the mixed air by the temperature control door 79R moves into the vent blow-out duct and is mixed with the air conditioned by the air mix door 76, thereby the conditioned air temperature controlled by the air mix door 76 is readjusted by the control of the temperature control doors.

The air conditioner for a motor vehicle according to the third embodiment comprises a temperature adjusting function and blow-out port change-over function (mode change-over function) of identical construction in right and left sides respectively, thereby through the individual control thereof the individual blow-out air temperature control and blow-out port change-over are performed which meet for the both passengers on right and left seats.

Figure 37:
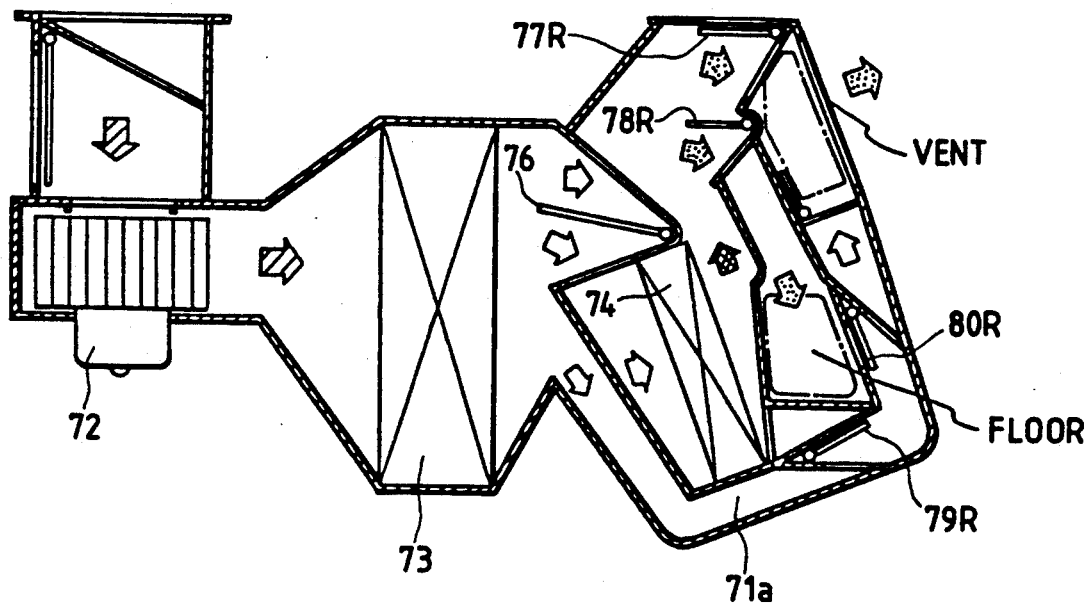
FIG. 37 is a schematic diagram showing air flow in the air conditioner shown in FIG. 33 during bi-level blow-out operation mode.

FIG. 37 shows the air flow in the bi-level mode wherein the floor blow-out air temperature and the right and left vent blow-out air temperatures are individually controlled respectively with the air mix door 76 and the right and left temperature control doors 79R, 79L.

Figure 38:
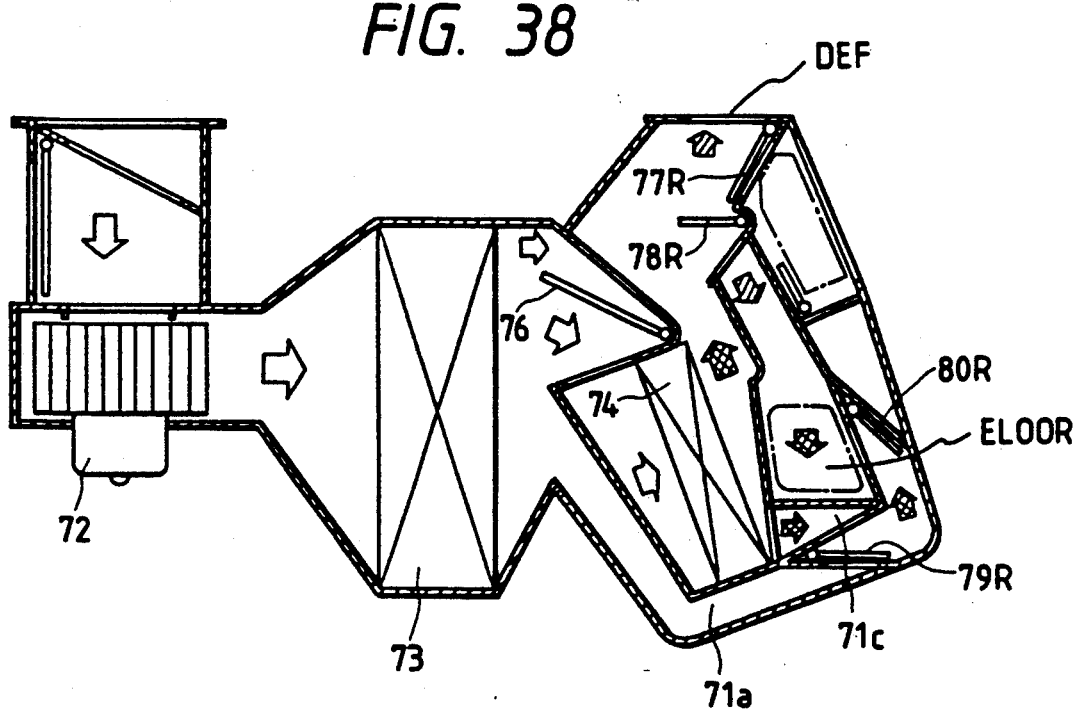
FIG. 38 is a schematic diagram showing air flow in the air conditioner shown in FIG. 33 during heater blow-out operation mode.
Figure 39:
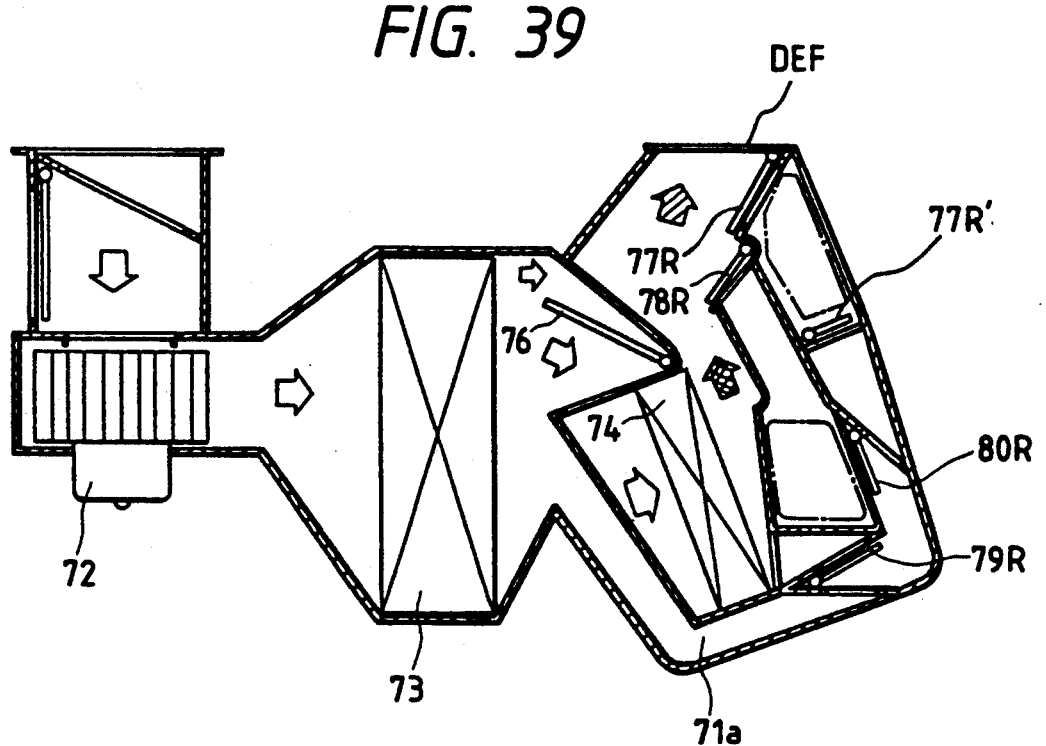
FIG. 39 is a schematic diagram showing air flow in the air conditioner shown in FIG. 33 during defroster blow-out operation mode.

FIG. 38 shows the air flow in the heater mode wherein the defroster blow-out air temperature and the right and left floor blow-out air temperatures are individually controlled respectively with the air mix door 76 and the right and left temperature control doors 79R, 79L.

FIG. 39 shows the air flow in the defroster mode wherein the defroster blow-out temperature is controlled by the air mix door 76. Further, auxiliary vent doors 77R, 77L which close only during the defroster mode prevent leakage of air from the vent blow-out ports.

The blow-out air temperature control of the air conditioner of the third embodiment proceeds substantially the same manner as in the second embodiment as explained in connection with the flow chart shown in FIG. 23 such that the explanation thereof is omitted.

As will be understood from the formulas (4) and (5) indicated in connection with the second embodiment, the blow-out air temperatures for the passengers on the right and left seats are individually controlled based upon the right and left solar radiation quantities and the respective set temperatures at the temperature setting units, a comfortable conditioned air for both the driver and the passenger next to the driver is obtained. Further, depending upon a desired blow-out air temperature level in the blow-out air temperature control the mode control doors 80R, 80L may be actuated to blow-out air from the floor blow-out ports in stead of the vent blow-out ports so as to meet the desire of the passengers.

According to the air conditioner of the third embodiment, blow-out air temperatures from right and left vent and floor blow-out ports are individually adjusted with the temperature control doors 79R, 79L and the mode control doors 40R, 40L and further the separate right and left vent doors 77R, 77L and the separate right and left floor doors 78R, 78L are respectively provided, thereby the right side and left side blow-out ports are also individually change-over, accordingly a confortable conditioned air for the both passengers on the right side and left side seats is obtained.

We claim:

1. An air conditioner for a motor vehicle comprising:
    a blower for taking-in air;
    an evaporator disposed downstream of said blower for cooling the air;
    a reheater disposed downstream of said evaporator for reheating the cooled air;
    a bypass passage arranged parallel to said reheater for bypassing the cooled air;
    an air mix door regulating the mixing ratio of the reheated air and the bypassing cooled air for generating conditioned air;
    a right side ventilation duct leading the conditioned air to a right side ventilation blow-out port, a left side ventilation duct leading the conditioned air to a left side ventilation blow-out port and a center ventilation duct leading the conditioned air to a center ventilation blow-out port which are arranged parallel each other and disposed downstream with respect to said reheater and said bypass passage,
    a first cooled air passage leading the cooled air upstream of said air mix door to said right side ventilation duct;
    a second cooled air passage leading the cooled air upstream of said air mix door to said left side ventilation duct;
    a first reheated air passage leading the reheated air said reheater to said right side ventilation duct;
    a second reheated air passage leading the reheated air downstream of said reheater to said left side ventilation duct;
    a first temperature adjusting door disposed at the juncture of said first cooled air passage and said first reheated air passage for controlling the respective opening degrees thereof;
    a second temperature adjusting door disposed at the juncture of said second cooled air passage and said second reheated air passage for controlling the respective opening degrees thereof;
    a sensor means for detecting the external thermal conditions in and out the motor vehicle; and
    a control unit for setting respective reference temperatures for the blow-out air at said right side ventilation blow-out port and said left side ventilation blow-out port with reference to a reference blow-out air temperature at said center ventilation blow-out port which is determined based upon a detected signal representing external thermal conditions from said sensor means, said control unit controlling the blow-out temperatures at said respective ventilation blow-out ports by actuating said air mix door and said first and second temperature adjusting doors with reference to the set reference temperatures for the respective ventilation blow-out ports.

2. An air conditioner for a motor vehicle according to claim 1, further comprising:
    temperature sensors disposed at said respective ventilation blow-out ports, said control unit further determining respective target blow-out air temperatures at said respective ventilation blow-out ports based upon the respective set reference temperatures and actuating said air mix door and said first and second temperature adjusting doors so as to reduce the difference between the predetermined respective target blow-out air temperatures at said respective ventilation blow-out ports and the detected blow-out air temperatures by said respective temperature sensors.

* * * * *